United States Patent
Hara et al.

(10) Patent No.: US 8,924,820 B2
(45) Date of Patent: Dec. 30, 2014

(54) MEMORY CONTROLLER, SEMICONDUCTOR MEMORY SYSTEM, AND MEMORY CONTROL METHOD

(71) Applicant: Kabushiki Kaisha Toshiba, Tokyo (JP)

(72) Inventors: Tokumasa Hara, Kanagawa (JP); Osamu Torii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 162 days.

(21) Appl. No.: 13/762,820

(22) Filed: Feb. 8, 2013

(65) Prior Publication Data

US 2014/0032992 A1    Jan. 30, 2014

Related U.S. Application Data

(60) Provisional application No. 61/676,630, filed on Jul. 27, 2012.

(51) Int. Cl.
| | |
|---|---|
| *G11C 29/00* | (2006.01) |
| *H03M 13/00* | (2006.01) |
| *G06F 12/02* | (2006.01) |
| *G06F 11/10* | (2006.01) |

(52) U.S. Cl.
CPC ........ *G06F 12/0246* (2013.01); *G06F 11/1008* (2013.01); *G06F 11/1072* (2013.01); *G06F 11/1068* (2013.01); *G06F 11/10* (2013.01)
USPC ............................. 714/773; 714/701; 714/774

(58) Field of Classification Search
CPC ............ G06F 11/1068; G06F 11/1072; G06F 11/1008
USPC .......................................... 714/773, 701, 774
See application file for complete search history.

(56) References Cited

U.S. PATENT DOCUMENTS

| | | | |
|---|---|---|---|
| 7,304,893 B1 * | 12/2007 | Hemink | 365/185.22 |
| 7,681,109 B2 * | 3/2010 | Litsyn et al. | 714/773 |
| 7,813,187 B2 * | 10/2010 | Lee | 365/189.05 |
| 7,818,525 B1 * | 10/2010 | Frost et al. | 711/165 |
| 7,904,780 B2 * | 3/2011 | Brandman | 714/752 |
| 8,001,441 B2 * | 8/2011 | Brandman | 714/763 |
| 8,112,689 B2 | 2/2012 | Hong et al. | |

(Continued)

FOREIGN PATENT DOCUMENTS

| | | |
|---|---|---|
| JP | 11-283396 | 10/1999 |
| JP | 2008-77810 | 4/2008 |
| JP | 2008-165805 | 7/2008 |
| JP | 2013-225830 A | 10/2013 |

*Primary Examiner* — Joseph D Torres
(74) *Attorney, Agent, or Firm* — Oblon, Spivak, McClelland, Maier & Neustadt, L.L.P.

(57) ABSTRACT

According to one embodiment, a memory system includes a non-volatile semiconductor memory that includes memory cells each storing 3 bits, a control unit that writes data to the non-volatile semiconductor memory, and an encoding unit that generates a first parity for user data stored in the first page, a second parity for user data stored in the second page, and a third parity for user data stored in the third page. The user data, the first parity, the third parity, and a portion of the second parity are written to the non-volatile semiconductor memory by a first data coding and a portion of the second parity and a portion of the third parity are written to the non-volatile semiconductor memory by second data coding in which the first page is 0 bit, the second page is 2 bits, and the third page is 1 bit.

13 Claims, 31 Drawing Sheets

(56) References Cited

U.S. PATENT DOCUMENTS

| | | | |
|---|---|---|---|
| 8,136,014 B2 * | 3/2012 | Uchikawa et al. ............ 714/763 |
| 8,140,935 B2 | 3/2012 | Hong et al. |
| 8,239,730 B2 * | 8/2012 | Uchikawa et al. ............ 714/763 |
| 8,254,167 B2 * | 8/2012 | Patapoutian et al. .... 365/185.03 |
| 8,355,279 B2 * | 1/2013 | Yoon et al. ............... 365/185.03 |
| 8,560,919 B2 * | 10/2013 | D'Abreu et al. .............. 714/758 |
| 8,724,381 B2 * | 5/2014 | Burger et al. ............ 365/185.03 |
| 2011/0090734 A1 * | 4/2011 | Burger et al. ............ 365/185.03 |
| 2012/0198135 A1 * | 8/2012 | Chilappagari et al. ........ 711/103 |
| 2013/0024605 A1 * | 1/2013 | Sharon et al. ................. 711/103 |
| 2013/0024743 A1 * | 1/2013 | Sharon et al. ................. 714/763 |
| 2013/0024746 A1 * | 1/2013 | Sharon et al. ................. 714/766 |
| 2013/0024747 A1 * | 1/2013 | Sharon et al. ................. 714/773 |

\* cited by examiner

| | | | | |
|---|---|---|---|---|
| U | USER DATA (Upper Page) | U PARITY | M PARITY |
| M | USER DATA (Middle Page) | M PARITY | |
| L | USER DATA (Lower Page) | L PARITY | M PARITY |

1 WL

USER DATA STORAGE AREA (DATA ALLOCATION BY FIRST METHOD) | PARITY STORAGE AREA (DATA ALLOCATION BY FIRST METHOD)

NUMBER OF CELLS — THRESHOLD VALUE

FIRST METHOD

| Page | DATA | | | | | | | |
|---|---|---|---|---|---|---|---|---|
| U | 1 | 1 | 1 | 0 | 0 | 0 | 0 | 1 |
| M | 1 | 1 | 0 | 0 | 1 | 1 | 0 | 0 |
| L | 1 | 0 | 0 | 0 | 0 | 1 | 1 | 1 |

CHANGE 3-bit DATA CODING

SECOND METHOD

| Page | DATA | | | | | | | |
|---|---|---|---|---|---|---|---|---|
| U2 | NOTHING | | | | | | | |
| M2 | (1, 1) | | (0, 1) | | (0, 0) | | (1, 0) | |
| L2 | 1 | 0 | 0 | 1 | 1 | 0 | 0 | 1 |

FIG.7

| | | | | |
|---|---|---|---|---|
| U | USER DATA (Upper Page) | U PARITY | VIRTUALLY NOTHING |
| M | USER DATA (Middle Page) | M PARITY | M PARITY (2 bits/Cell) |
| L | USER DATA (Lower Page) | M PARITY | M PARITY |

1 WL { (rows U, M, L)

USER DATA STORAGE AREA (DATA ALLOCATION BY FIRST METHOD) | PARITY STORAGE AREA

PARITY STORAGE AREA #1 (DATA ALLOCATION BY FIRST METHOD) | PARITY STORAGE AREA #2 (DATA ALLOCATION BY SECOND METHOD)

FIG.8

| Page | DATA | | | | | | | |
|---|---|---|---|---|---|---|---|---|
| M2 | (1, 1) | | (0, 1) | | (0, 0) | | (1, 0) | |
| L2 | 1 | 0 | 0 | 1 | 1 | 0 | 0 | 1 |

CONVERSION INTO 3-PAGE DATA

| Page | DATA | | | | | | | |
|---|---|---|---|---|---|---|---|---|
| U | 1 | 1 | 1 | 0 | 0 | 0 | 0 | 1 |
| M | 1 | 1 | 0 | 0 | 1 | 1 | 0 | 0 |
| L | 1 | 0 | 0 | 0 | 0 | 1 | 1 | 1 |

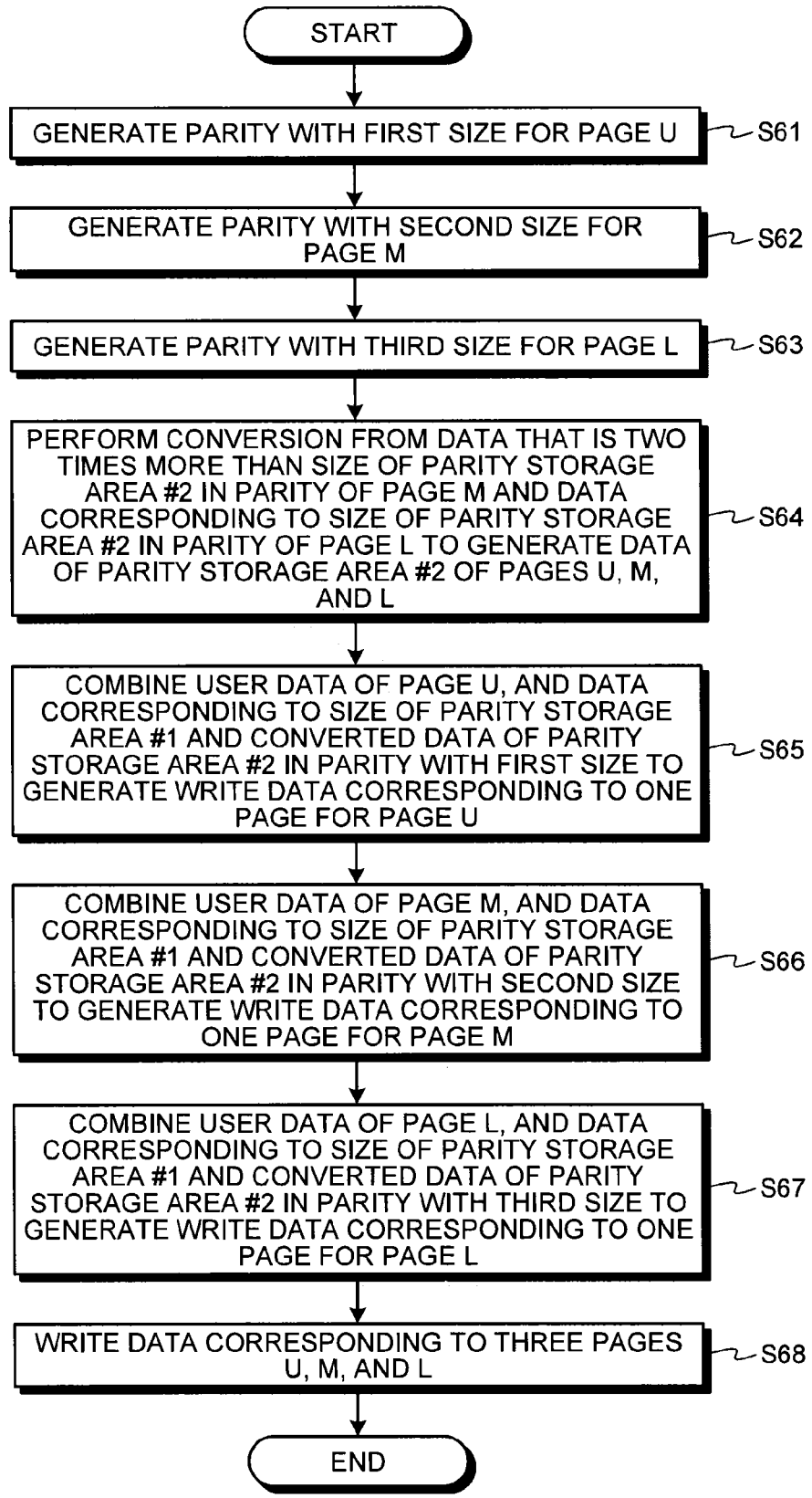

| | Page | DATA | | | | | | | |
|---|---|---|---|---|---|---|---|---|---|
| IN CASE OF PARITY STORAGE AREA #3 | U3 | 1 | 0 | 0 | 1 | 1 | 0 | 0 | 1 |
| | M3 | (1, 1) | | (0, 1) | | (0, 0) | | (1, 0) | |

| | Page | DATA | | | | | | | |
|---|---|---|---|---|---|---|---|---|---|
| IN CASE OF PARITY STORAGE AREA #2 | M2 | (1, 1) | | (0, 1) | | (0, 0) | | (1, 0) | |
| | L2 | 1 | 0 | 0 | 1 | 1 | 0 | 0 | 1 |

CHANGE TO 3-PAGE DATA

| Page | DATA | | | | | | | |
|---|---|---|---|---|---|---|---|---|
| U | 1 | 1 | 1 | 0 | 0 | 0 | 0 | 1 |
| M | 1 | 1 | 0 | 0 | 1 | 1 | 0 | 0 |
| L | 1 | 0 | 0 | 0 | 0 | 1 | 1 | 1 |

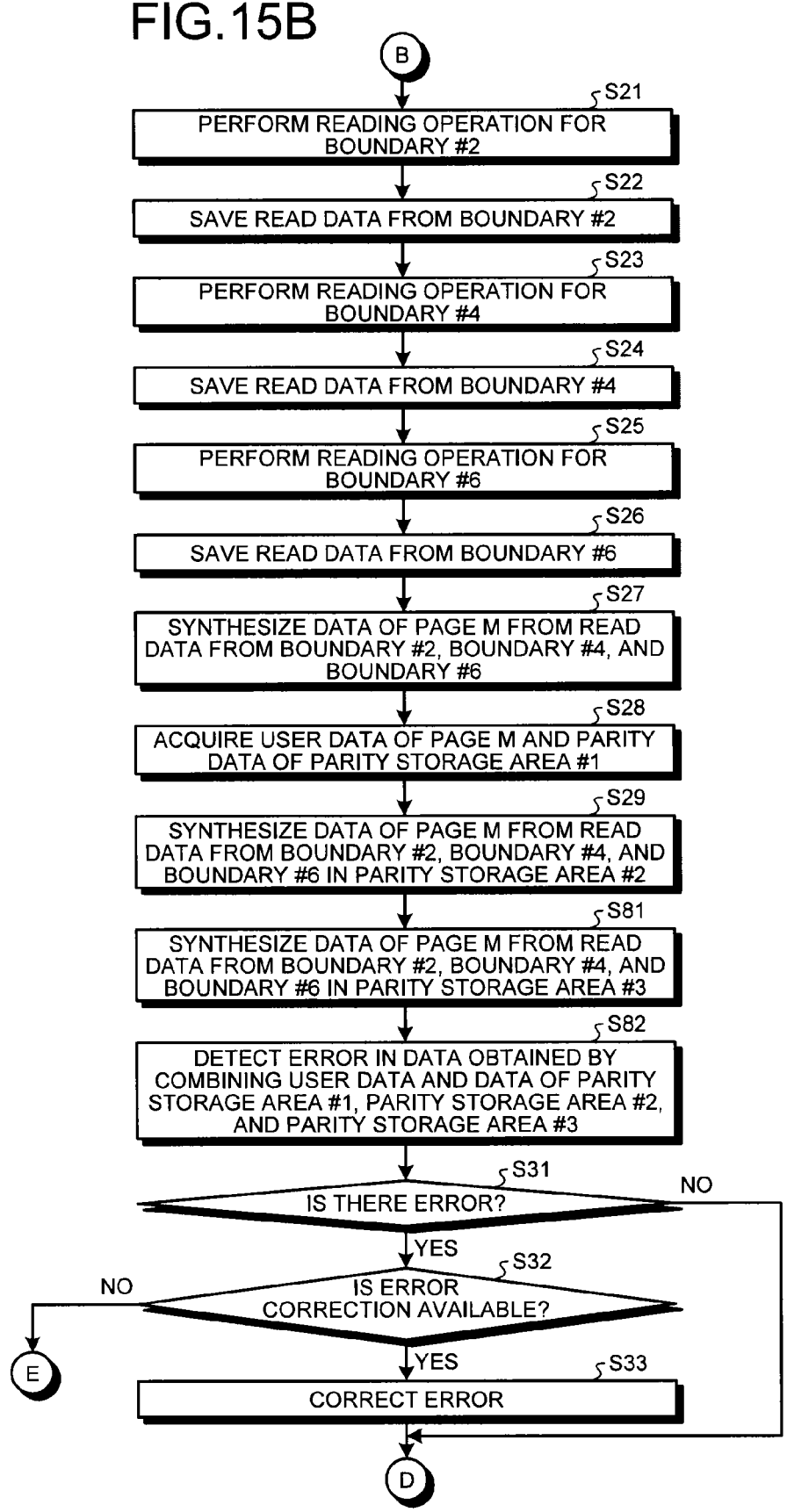

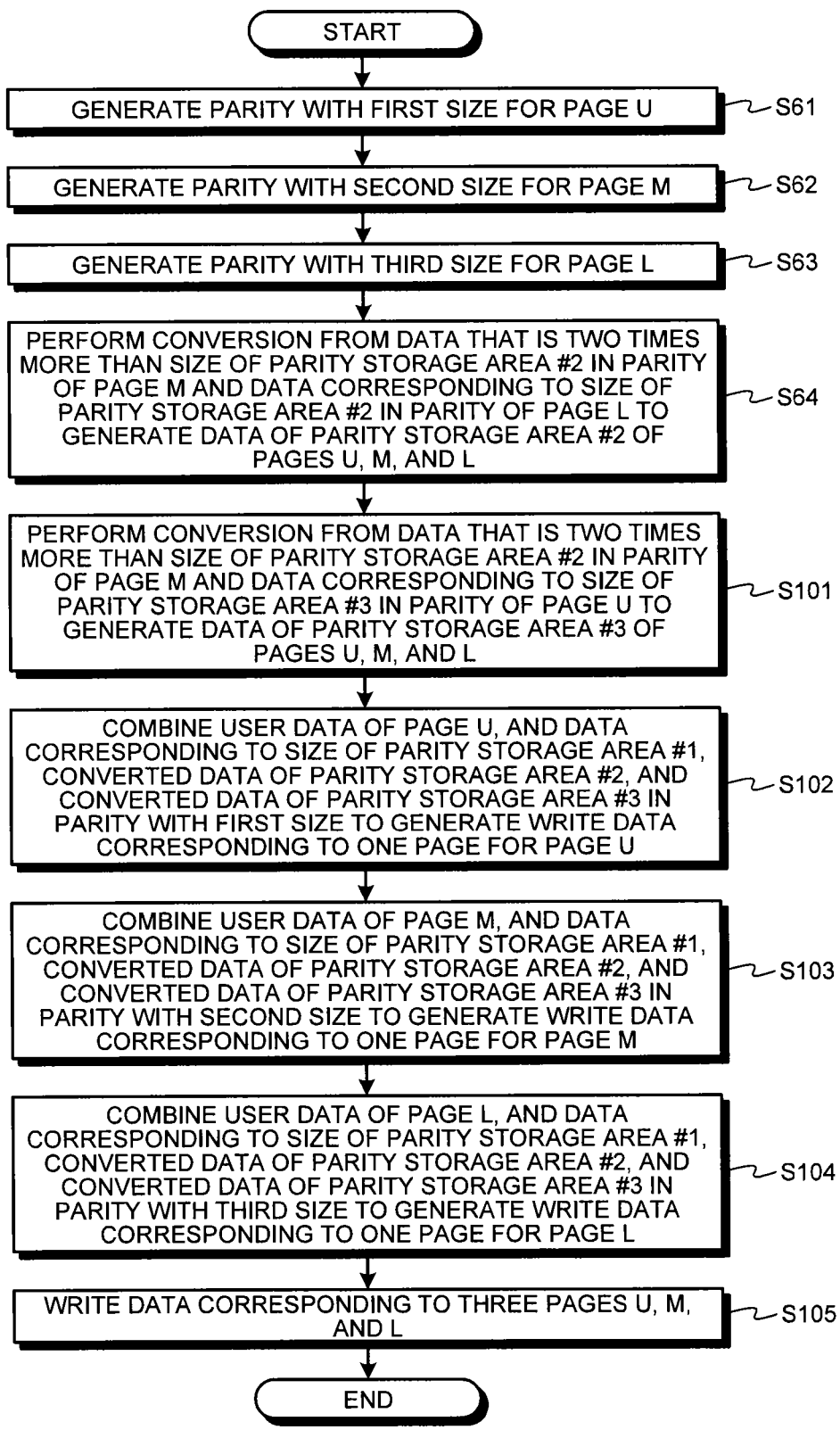

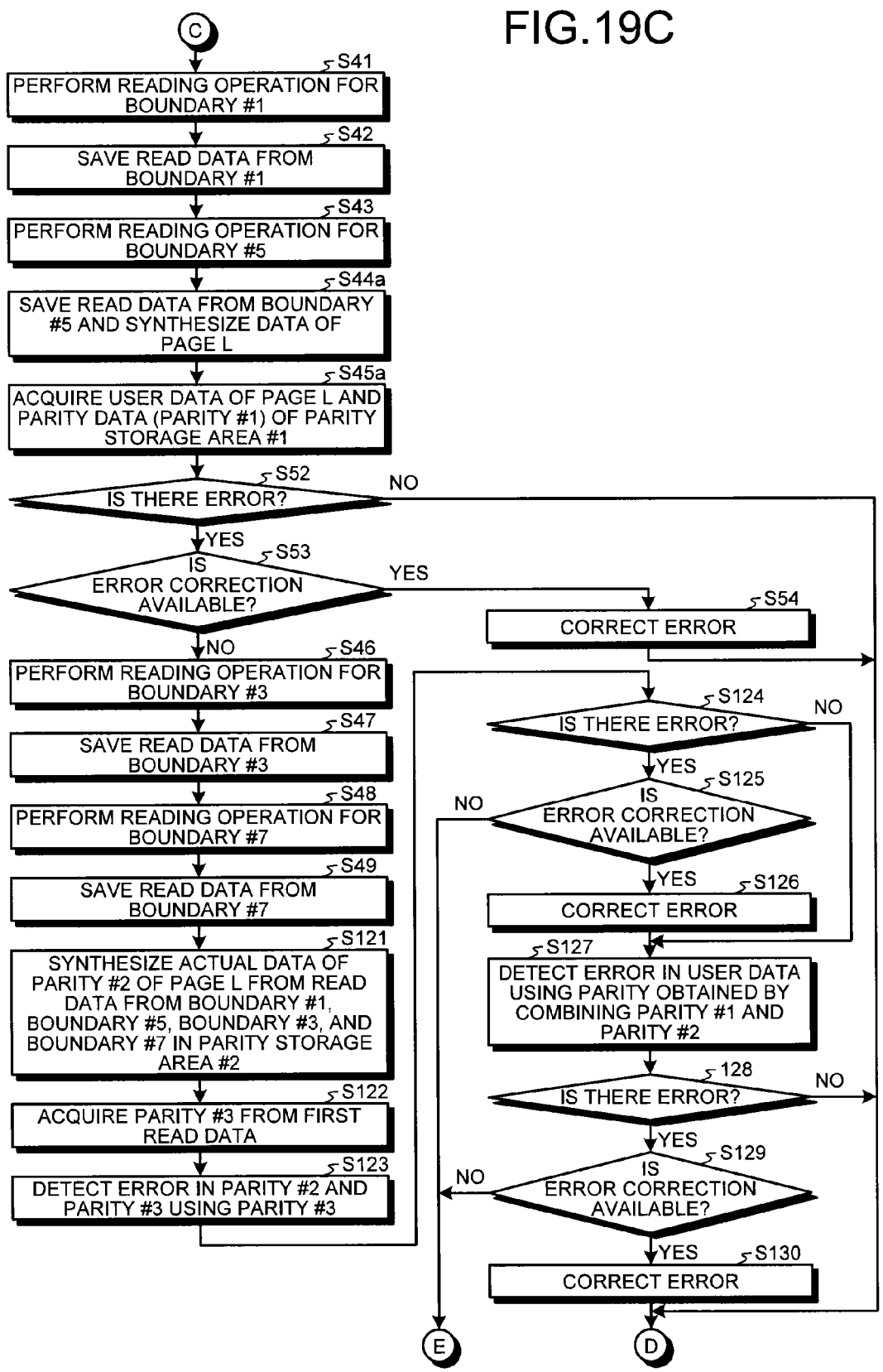

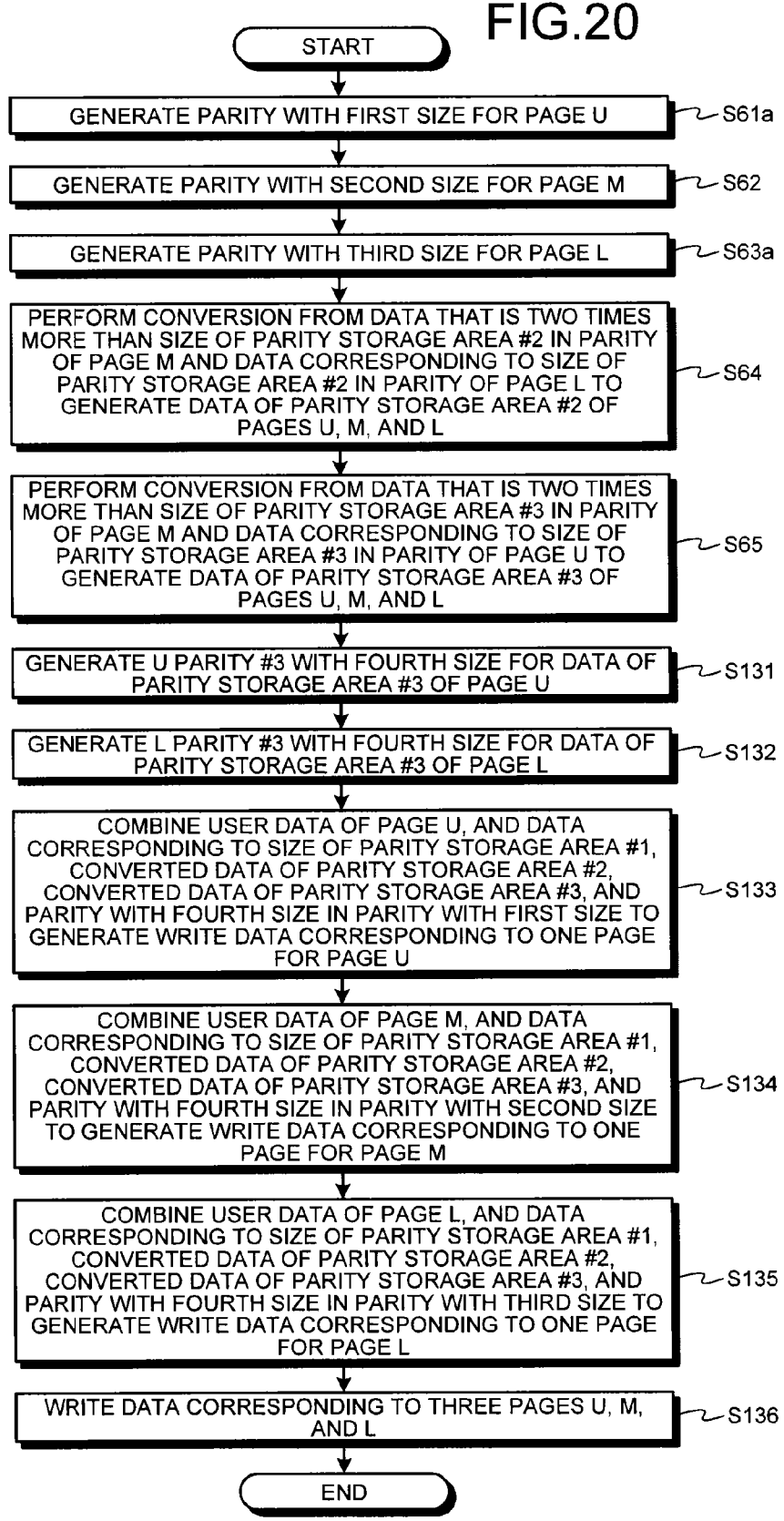

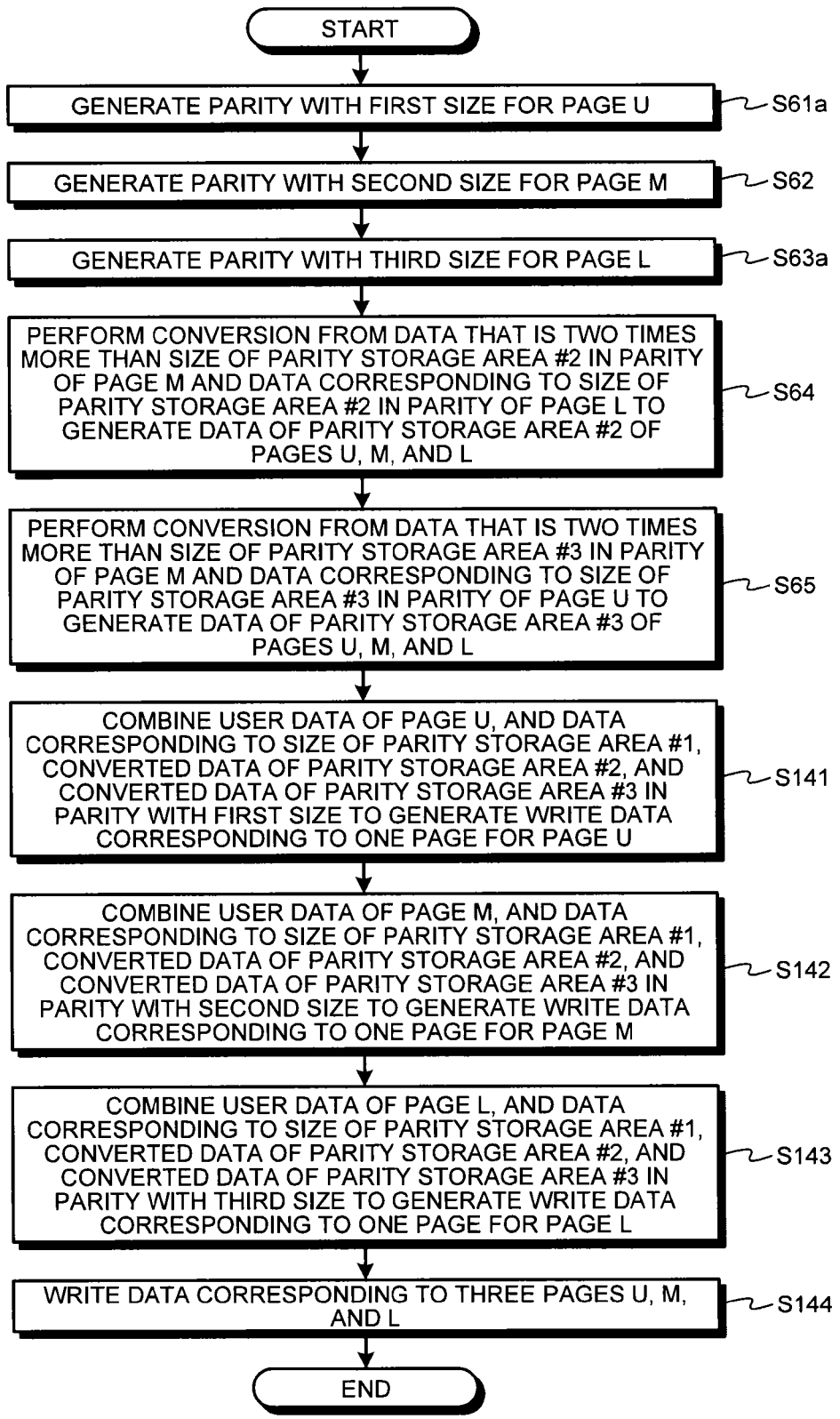

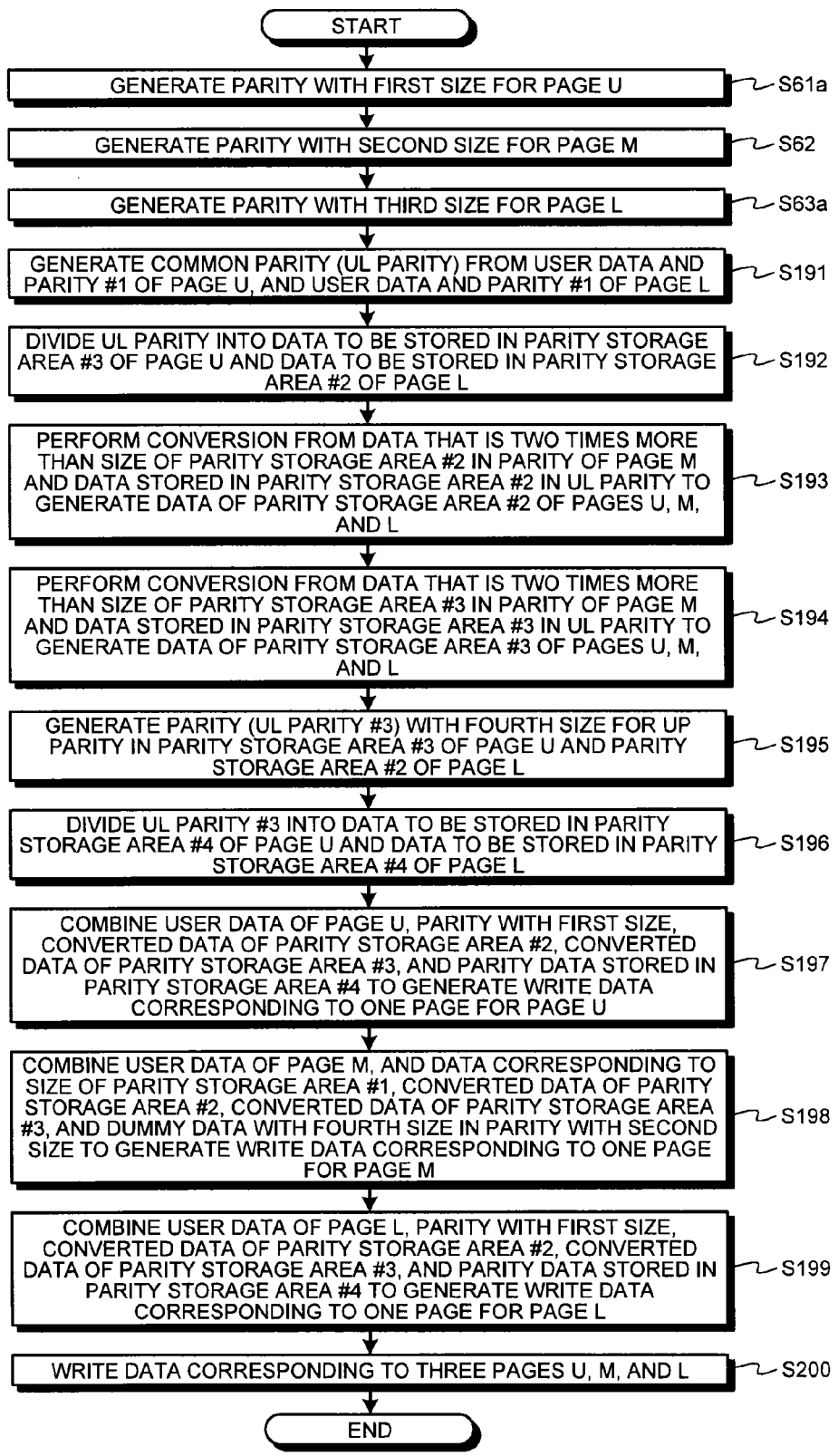

US 8,924,820 B2

MEMORY CONTROLLER, SEMICONDUCTOR MEMORY SYSTEM, AND MEMORY CONTROL METHOD

CROSS-REFERENCE TO RELATED APPLICATIONS

This application is based upon and claims the benefit of priority from Provisional Patent Application No. 61/676,630, filed on Jul. 27, 2012; the entire contents of which are incorporated herein by reference.

FIELD

Embodiments described herein relate generally to a memory controller, a semiconductor memory system, and a memory control method.

BACKGROUND

In a NAND flash memory, in general, error correction is performed for data to be stored. In recent years, with the development of a miniaturization technique and a super multi-level cell technique in the NAND flash memory, the probability of an error occurring in the storage data has increased.

When the probability of an error occurring in data increases with the development of a miniaturization technique and a super multi-level cell technique of the NAND flash memory, the amount of parity data required to maintain data validity after error correction increases. This means an increase in the memory size required for retaining the parity data, which causes an increase in costs. Alternatively, when the amount of parity data is not increased and error correction capability is not improved in order to prevent an increase in costs, it is difficult to correct an error in the storage data and the probability of the error remaining increases.

BRIEF DESCRIPTION OF THE DRAWINGS

FIG. 7 is a diagram illustrating an example of a method of storing data for one word line in the NAND flash memory according to the first embodiment.

FIG. 8 is a diagram illustrating an example of a conversion table when data which is allocated by a second method according to the first embodiment is stored in the NAND flash memory.

FIG. 10 is a flowchart illustrating an example of a process of writing data to the NAND flash memory according to the first embodiment.

FIGS. 15A to 15C are flowcharts illustrating an error correction process when data is read from the NAND flash memory 2 according to the second embodiment.

FIG. 16 is a flowchart illustrating an example of a process of writing data to the NAND flash memory according to the second embodiment.

FIGS. 19A to 19C are flowcharts illustrating an example of an error correction process when data is read from the NAND flash memory according to the third embodiment.

FIG. 20 is a flowchart illustrating an example of a process of writing data to the NAND flash memory according to the third embodiment.

FIG. 22 is a flowchart illustrating an example of a process of writing data to the NAND flash memory according to the fourth embodiment.

FIG. 25 is a flowchart illustrating an example of a process of writing data to the NAND flash memory according to the fifth embodiment.

DETAILED DESCRIPTION

In general, according to one embodiment, there is provided a memory system including: a non-volatile semiconductor memory that includes memory cells each storing 3 bits, and each bit data of the 3 bits data is allocated to each threshold value distribution; a control unit that performs control such that the threshold value distribution is allocated by first data coding in which a first page, a second page, and a third page are each 1 bit and data is written to the non-volatile semiconductor memory, a first bit of the 3 bits data indicating data of the first page, a second bit thereof indicating data of the second page, and a third bit thereof indicating data of the third page; and an encoding unit that generates a first parity with a first size for user data stored in the first page, generates a second parity with a second size for user data stored in the second page, and generates a third parity with a third size for user data stored in the third page. The control unit performs control such that the user data, the first parity, the third parity, and a portion of the second parity are written to the non-volatile semiconductor memory by the first data coding and performs control such that the threshold value distribution is allocated by second data coding in which the first page is 0 bit, the second page is 2 bits, and the third page is 1 bit and a portion of the second parity and a portion of the third parity are written to the non-volatile semiconductor memory.

Exemplary embodiments of a memory controller, a semiconductor memory system, and a memory control method will be explained below in detail with reference to the accompanying drawings. The present invention is not limited to the following embodiments.

First Embodiment

Figure 1:
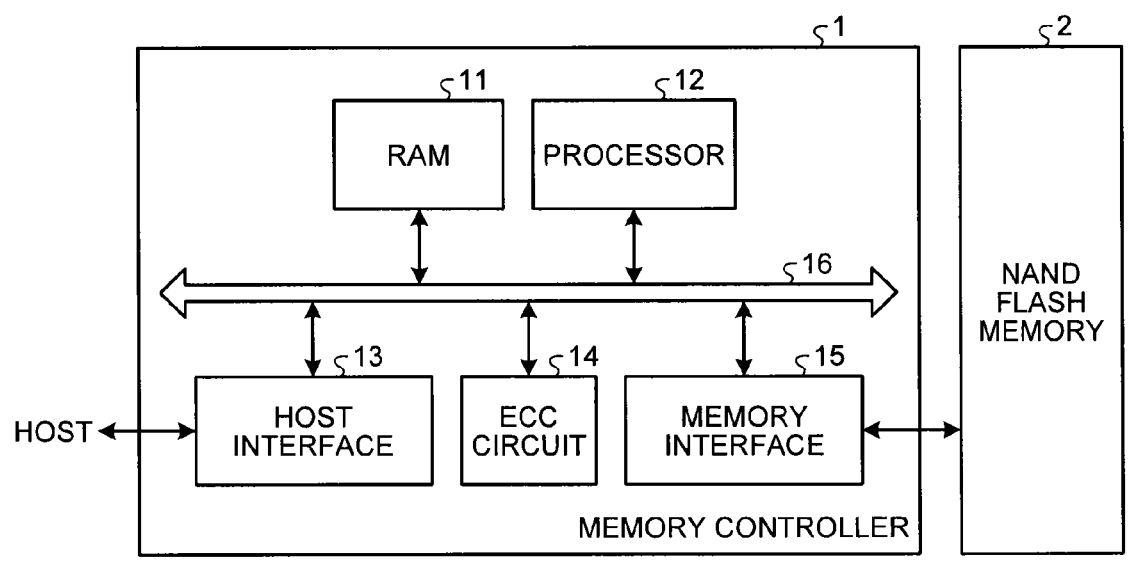
FIG. 1 is a block diagram illustrating an example of the structure of a semiconductor memory system according to a first embodiment.

FIG. 1 is a block diagram illustrating an example of the structure of a semiconductor memory system according to a first embodiment. The semiconductor memory system according to this embodiment includes a memory controller 1 and a NAND flash memory (non-volatile semiconductor memory) 2. The NAND flash memory 2 is a non-volatile memory and performs operations, such as writing, reading, and deletion, under the control of the memory controller 1.

The memory controller 1 includes a random access memory (RAM) 11, a processor 12, a host interface 13, an ECC (Error Checking and Correction) circuit 14, a memory interface (interface unit) 15, and a data bus 16.

The host interface 13 includes a protocol required for data exchange with the host. Examples of the host include a personal computer and a CPU (Central Processing Unit) core. The memory interface 15 includes a protocol required for data exchange with the NAND flash memory 2 and transmits and receives commands, addresses, control signals, and data to and from the NAND flash memory 2.

The processor 12 is a control unit that generally controls each component of the semiconductor memory system and includes, for example, a CPU core, a ROM (Read Only Memory), and a DMA (Direct Memory Access) controller. When receiving a command from the host through the host interface 13 and the data bus 16, the processor 12 (control unit) performs control according to the command. For example, the processor 12 instructs the memory interface 15 to write data to the NAND flash memory 2 or read data from the NAND flash memory 2, in response to the command from the host. In addition, the processor 12 instructs the ECC circuit 14 to perform an error correction coding process or an error correction decoding process.

The ECC circuit 14 performs the error correction coding process for data to be written to the NAND flash memory 2 and performs a process of detecting an error from the data stored in the NAND flash memory 2 or correcting the error, in response to the instructions from the processor 12. The RAM 11 is used as a working memory of the processor 12. Although not illustrated in the example of the structure illustrated in FIG. 1, the memory controller 1 further includes, for example, a ROM that stores code data for interface with the host. As such, the structure of FIG. 1 is an illustrative example and the semiconductor memory system according to this embodiment is not limited to the example of the structure illustrated in FIG. 1. The general structure of the semiconductor memory system may be changed.

Figure 2:
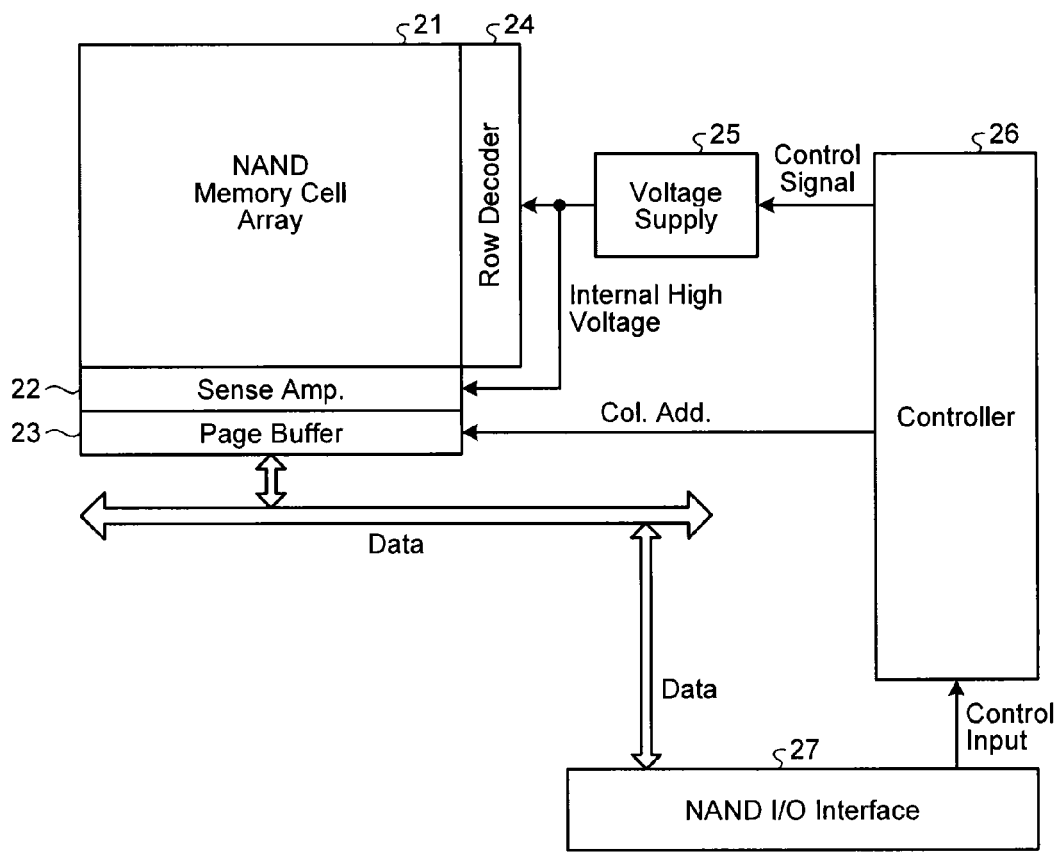
FIG. 2 is a diagram illustrating an example of the detailed block diagram of the NAND flash memory.

FIG. 2 is a diagram illustrating an example of the detailed block diagram of the NAND flash memory 2. As illustrated in FIGS. 1 and 2, a structure in which the NAND flash memory 2 is not provided with an ECC circuit, but the memory controller 1 is provided with the ECC circuit 14 will be described as an example. As illustrated in FIG. 2, the NAND flash memory 2 includes a NAND memory cell array 21, a sense Amp. (Amplifier) 22, a page buffer 23, a row decoder 24, a voltage supply 25, a controller 26, and a NAND I/O (Input/Output) interface 27. FIG. 2 illustrates an example of the general structure and the NAND flash memory 2 is not limited to the structure illustrated in FIG. 2. The operation of each unit is the same as that in the related art and the detailed description thereof will not be repeated.

In addition, a structure in which the memory controller is not provided with the ECC circuit 14, but the NAND flash memory is provided with the ECC circuit may be used. The operation according to this embodiment can also be applied to this structure. In this case, the ECC circuit of the NAND flash memory may perform the operation of the ECC circuit 14 of the NAND flash memory 2, which will be described below.

Next, the overall operation of the writing and reading process of the NAND flash memory 2 according to this embodiment will be described. First, when receiving an instruction to write data from the host, the processor 12 instructs the ECC circuit 14 to perform data error correction coding. Data to be write read transmitted from the host is temporarily stored in the RAM 11. The ECC circuit 14 performs the error correction coding process on the basis of the data stored in the RAM 11 to generate an error correction code.

Then, the processor 12 instructs the memory interface 15 to write data and the error correction code (hereinafter, referred to as a parity in this embodiment) generated for the data to the NAND flash memory 2. At that time, the processor 12 notifies the write address of the data and the error correction code to the memory interface 15 and the memory interface 15 writes the data and the parity to the notified address. The processor 12 stores the correspondence between the logical address and the physical address of the NAND flash memory 2 and designates the physical address as the write address to the memory interface 15. In this embodiment, an example in which the logical address and the physical address are directly converted during writing is described, but the invention is not limited thereto. For example, a method may be used which converts the address in multiple stages (the logical address of the host apparatus is converted into the logical address of the semiconductor memory system and is then converted into the physical address).

When receiving an instructs to read data from the host, the processor 12 instructs the memory interface 15 to read the data from the NAND flash memory 2. Since the host designates data to be read using the logical address, the processor 12 notifies a corresponding physical address to the memory interface 15 on the basis of the stored correspondence between the logical address and the physical address of the NAND flash memory 2. At that time, the processor 12 also reads the parity corresponding to the read data. The processor 12 instructs the ECC circuit 14 to perform the error correction decoding process based on the read data and parity. The ECC circuit 14 performs the error correction decoding process in response to the instruction. The processor 12 transmits data subjected to the error correction decoding process to the host through the host interface 13.

Figure 3:
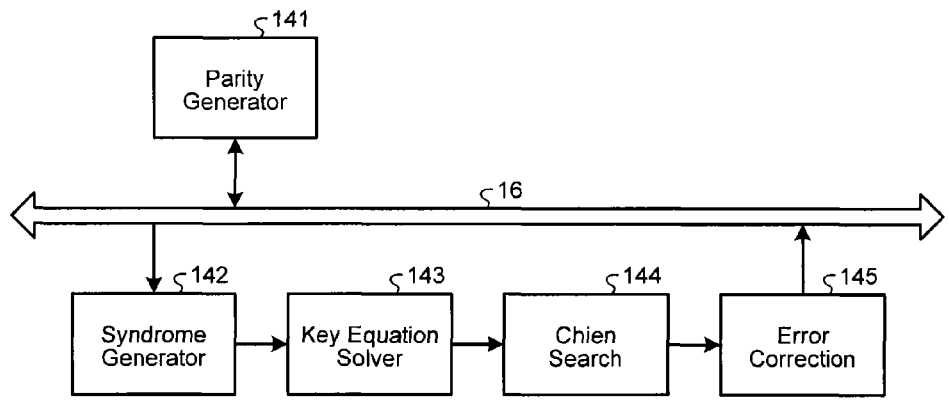
FIG. 3 is a diagram illustrating an example of an ECC circuit.

FIG. 3 is a diagram illustrating an example of the structure of the ECC circuit 14. The ECC circuit 14 illustrated in FIG. 3 is a BCH ECC circuit. In the ECC circuit 14, a parity generator (encoding unit) 141 performs the error correction coding process on the basis of write data with a predetermined size which is input through the data bus 16 to generate the parity when data is written to the NAND flash memory 2. The predetermined size may be set to an arbitrary value and is, for example, a sector size. The sector size is, for example, 512 bytes (4096 bits). The parity generator 141 returns the generated parity to the data bus 16.

A syndrome generator 142, a key equation solver 143, a Chien search unit 144, and an error correction unit 145 form an error correction processing unit that is used for an operation of reading data from the NAND flash memory 2, detect whether there is an error in the read data, and output error-corrected data. The read data is input from the data bus 16 to the syndrome generator 142. The syndrome generator 142 forms a syndrome on the basis of the input data and inputs the syndrome to the key equation solver 143. The key equation solver 143 derives an error position polynomial using the syndrome and determines the number of bits of the error. When the number of bits of the error is greater than 1, the key equation solver 143 inputs the error position polynomial to the Chien search unit 144. The Chien search unit 144 specifies the position of the bits of the error on the basis of the input error position polynomial. The error correction unit 145 inverts the bit data according to the position of the bits of the error to correct the error.

The structure illustrated in FIG. 3 is an illustrative example and the structure of the ECC circuit 14 according to this embodiment is not limited to that illustrated in FIG. 3. As the error correction method, various methods, such as BCH, a Reed-Solomon code, and LDPC (Low Density Parity Check), have been put to practical use. The error correction method is not limited to BCH, but any error correction method may be used.

Figure 4:
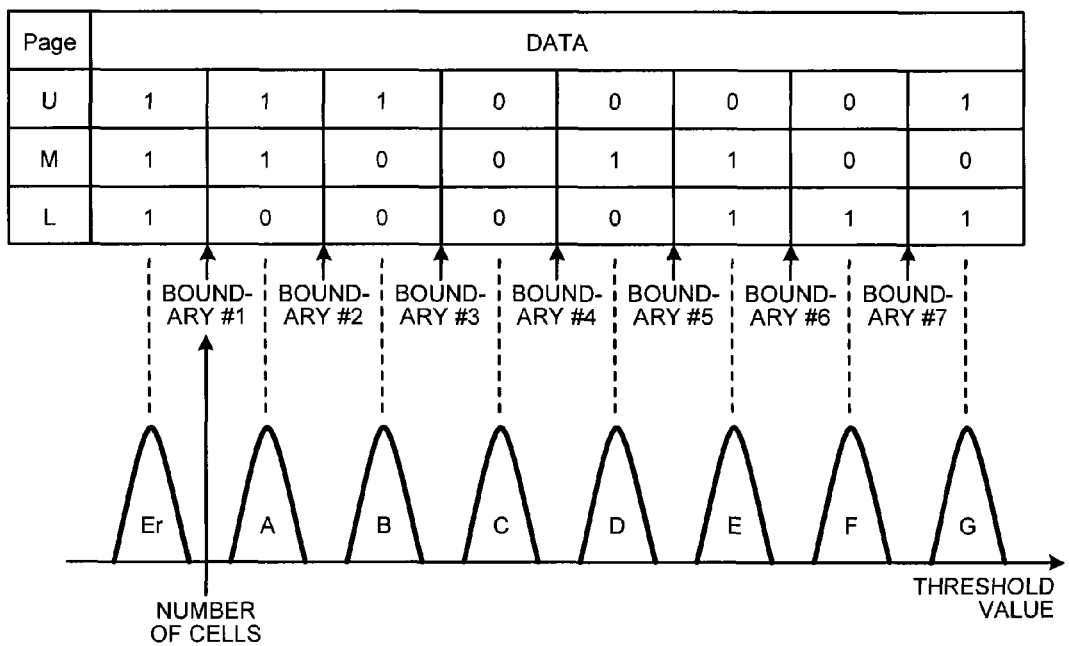
FIG. 4 is a diagram illustrating an example of the threshold value of a memory call and the allocation of data when data is stored in the memory cell of the NAND flash memory.

The NAND flash memory 2 stores data of 3 bits or more in one memory cell. In this embodiment, an example in which 3 bits data is stored in one memory cell will be described. FIG. 4 is a diagram illustrating an example of the allocation of threshold values and data to the memory cells when data is stored in the memory cells of the NAND flash memory 2. In order to store 3 bits data in one memory cell, seven boundaries, that is, boundary #1 to boundary #7, which are boundary threshold values, are used to define eight kinds of threshold value distributions. The NAND flash memory 2 performs reading and writing operations in a page unit. In general, in a multi-valued cell, different pages are allocated to each bit stored in one memory cell. It is assumed that page addresses corresponding to 3 bits are represented by U (Upper), M (Middle), and L (Lower).

In FIG. 4, the upper part illustrates an example of the correspondence between a combination of the value of data in each page stored in each memory cell and the threshold value of the memory cell. In FIG. 4, the lower part illustrates an example of the distribution (threshold value distribution) of the number of cells when the threshold value of the memory cell is the horizontal axis and the number of cells is the vertical axis.

As illustrated in FIG. 4, among the pages U, M, and L, in the page U, there are two boundaries (boundary #3 and boundary #7 in FIG. 2) where the value of data is 1 to 0 or 0 to 1. In the page M, there are three boundaries (boundary #2, boundary #4, and boundary #6 in FIG. 2). In the page L, there are two boundaries (boundary #1 and boundary #5 in FIG. 2). Hereinafter, the allocation of the number of boundaries (division number) to each page in the order of U, M, and L is referred to as 2-3-2 division. The allocation of the boundaries to each page is not limited thereto.

Next, the error of the data stored in the NAND flash memory will be described. An error occurs in the data stored in the NAND flash memory due to various factors and the typical error factors are charge leakage, a soft program, and an over-program.

For the error caused by the charge leakage, a cell to which data has been written and which has become an OFF cell is read as an ON cell. The charge leakage means that electrons trapped in a floating gate of the memory cell or an oxide film leak to the channel of the memory cell through the oxide film.

The soft program means that a non-selection read voltage is applied during a reading operation and some electrons flows from the channel to the floating gate. For the error due to the soft program, the memory cell to which no data has been written and which has become an ON cell is read as an OFF cell.

The over-program means that the memory cell with a relatively high writing speed during writing has a threshold voltage higher than the upper limit of the voltage after writing. For the error due to the over-program, the memory cell to which no data has been written and which has become an ON cell is read as the OFF cell.

Among the above-mentioned three typical error factors, the charge leakage and the soft program occur due to the movement of the threshold value distribution. In general, it has been known that the amount of movement of the threshold value distribution varies depending on a combination of the position of the threshold value distribution and the factors. For example, the amount of movement of the threshold value distribution due to the charge leakage increases as the potential of the threshold value distribution increases. The reason is that the threshold value distribution is moved to an electrical balance point due to the charge leakage, but the electrical balance point of the memory cell is appropriately 0 V. In contrast to the charge leakage, the amount of movement of the threshold value distribution due to the soft program increases as the potential of the threshold value distribution is reduced. This is because the voltage which causes the injection of charge and is applied to the memory cell increases as the threshold value is reduced.

As illustrated in FIG. 4, there are a plurality of boundaries where data is inverted for one page. For example, the lower page (page L) includes two boundaries, that is, boundary #1 and boundary #5 where data is inverted. As described above, the amount of movement of the threshold value in the vicinity of each boundary due to the error factors is not uniform. As a result, in three pages with different boundaries, the amount of error generated is not uniform after a given number of error factors are received.

Since the NAND flash memory reads or writes data in a unit of a page, data error correction is generally performed in the unit of a page or a unit of a frame obtained by dividing one page. However, since the amount of error generated is not uniform due to the error factors and a combination of the boundary positions in each page, the amount of error generated is concentrated on a given page according to the error factors and is beyond the error correction capability of the page. As a result, the possibility that the error will not be corrected increases.

In the related art, in order to solve the problem that the error of a specific page is not likely to be corrected due to non-uniformity in the amount of error generated between the pages, the amount of error generated from each page is predicted and the parity is non-uniformly allocated to each page according to the percentage. Typically, the parity is allocated such that the percentage of the middle page (page M) with three boundaries, which is the largest number of boundaries, is high and the percentages of the upper page (page U) and the lower page with two boundaries are low. When the total capacity of the memory is constant in order to prevent an increase in costs, a predetermined amount of memory is non-uniformly allocated to each page. In this case, a portion of the area of the upper page or the lower page (or both the upper and lower pages) is allocated as a parity area of the middle page such that the amount of parity of the middle page increases and the amount of parity of the upper page or the Lower page (or both the upper and lower pages) decreases.

Figure 5:
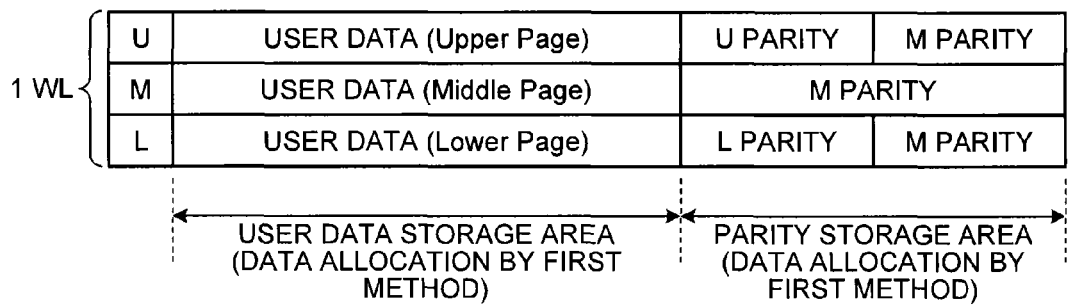
FIG. 5 is a diagram illustrating an example in which a parity area of a middle page is allocated to both an upper page and a lower page and is stored in one word line.

FIG. 5 is a diagram illustrating an example in which the parity area of the middle page is allocated to both the upper page and the lower page and the parity is stored in one word line. In the example illustrated in FIG. 5, when the middle page is read, it is necessary to acquire data of the upper page or the lower page (or both the upper and lower pages) in order to perform error correction all parities, and a read operation using a total of 5 or 7 boundaries is needed. For the middle page, even when the parity is non-uniformly allocated to each page, a read operation using three boundaries is needed and the speed of the reading operation is lower than that of a reading operation using two boundaries of another page. As illustrated in the example of FIG. 5, when the parity is non-uniformly allocated, the speed of the reading operation is significantly reduced.

In this embodiment, as described above, in addition to the normal data allocation method illustrated in FIG. 4, data allocation which virtually expands the middle page to 2 bits is used to allocate a large amount of data to the middle page. In this way, error correction capability is improved and the speed of the reading operation is improved, as compared to the method according to the related art in which the parity is non-uniformly allocated.

Figure 6:
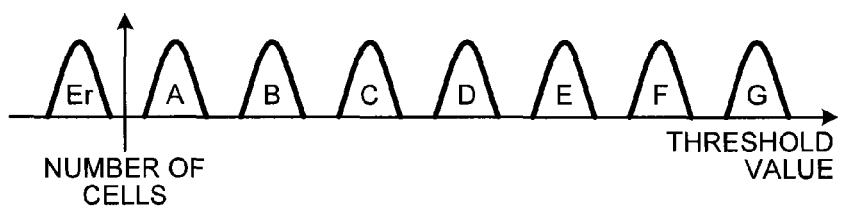
FIG. 6 is a diagram illustrating an example of a threshold value distribution and data allocation according to the first embodiment.

FIG. 6 is a diagram illustrating an example of the threshold value distribution and data allocation according to this embodiment. In this embodiment, two kinds of data allocation methods, that is, a data allocation method (first method) illustrated in the upper part of FIG. 6 and a new data allocation method (second method) illustrated in the lower part of FIG. 6 are used. The first method is the same as the normal data allocation method illustrated in FIG. 4. In the second method, a new upper page, a new middle page, and a new lower page are defined and the data allocation method (data coding) is changed from the first method. Specifically, as illustrated in FIG. 6, no data is allocated to the new upper page (hereinafter, referred to as a page U2), the new middle page (hereinafter, referred to as a page M2) is binary data with three boundaries, and the new lower page (hereinafter, referred to as a page L2) is unary data with four boundaries.

The position of the boundaries in the page M2 is the same as that illustrated in FIG. 4 and the position of the boundaries in the page L2 is a combination of the positions of the boundaries in the lower page and the upper page in the example illustrated in FIG. 4. Data allocation by the second method makes it possible to virtually expand the amount of data per cell in the page M2 to 2 bits. The page U2 does not include virtual data. In the page L2, the number of bits per cell is one, which is the same as that in the example illustrated in FIG. 4. However, as described above, four determination boundaries are needed to read the data of the page L2 and it is difficult to obtain data using only the lower page reading operation corresponding to the example illustrated in FIG. 4. It is necessary to add the upper page reading operation illustrated in FIG. 4.

In this embodiment, the data allocation method illustrated in FIG. 4 is used as the first method, but the invention is not limited thereto. For example, 2-2-3 division or 3-2-2 division may be used, that is, the upper page or the lower page may have three boundaries. In this case, 2 bits may be virtually allocated to the page with three boundaries, no data may be virtually given to one of two divided pages, and the other page may include four boundaries.

FIG. 7 is a diagram illustrating an example of a method of storing data for one word line in the NAND flash memory 2 in this embodiment. As illustrated in FIG. 6, data corresponding to three pages is stored in one word line and each page is divided into a user data storage area that stores user input data and a parity storage area that stores a parity for ECC correction. The method illustrated in FIG. 7 differs from the example according to the related art illustrated in FIG. 5 in which data for one word line is stored in the non-volatile memory in that the parity storage area is divided into two areas and one (parity storage area #2) of the two divided areas is used for data allocation by the second method. In this embodiment, when the virtual data sizes of the page U2, the page M2, and the page L2 are considered, the parity size which can be stored in the parity area of the middle page is the largest, followed by the data size of the lower page and the data size of the upper page. Among the parity storage areas, the size of parity storage area #2 is determined according to non-uniformity in the amount of error generated between the pages.

That is, for the page U2, the page M2, and the page L2, the amount of parity of each page is determined and the parity corresponding to the amount of parity of each page is generated during coding when data is stored in the NAND flash memory 2. The parity (L parity) of the page L is stored in the page L and the parity (U parity) of the page U is stored in the page U. A portion of the parity (M parity) of the page M is stored in the page M by the first method and the remainder of the M parity is stored in the pages U and M by the second method. Since the M parity is stored in second storage area #2 of the page U, the amount of parity of the page U is less than the L parity.

In this embodiment, the memory controller 1 performs a process using data allocation by the second method. However, in practice, when the NAND flash memory 2 corresponds to a plurality of kinds of data allocation, the structure of the NAND flash memory 2 becomes complicated. In order to the NAND flash memory 2 can be configured such that a writing and reading operation performed by one kind of data allocation (the normal data allocation illustrated in FIG. 4), the data of the area to which data is allocated by the second method is converted such that data can be written by the first method. Then, the converted data is output to the NAND flash memory 2.

FIG. 8 is a diagram illustrating an example of a conversion table when data which is allocated by the second method according to this embodiment is stored in the NAND flash memory 2. As illustrated in FIG. 8, the 2 bits data of the page M2 and the 1 bit data of the page L2 are converted into 3 pages data of the first method by the second method. For example, in the second method, as illustrated in FIG. 6, data (1, 1) of the page M2 and data 0 of the page L2 correspond to a threshold value distribution A. On the other hand, data corresponding to the threshold value distribution A is 1 in the page U, 1 in the page M, and 0 in the page L in the first method. Therefore, when the data of the page M2 is (1, 1) and the data of the page L2 is 0, the conversion table illustrated in FIG. 8 may be used to convert the data into 1, 1, and 0 for the pages U, M, and L, respectively, and the converted data may be output to the NAND flash memory 2.

FIGS. 9A to 9E are flowcharts illustrating an example of the error correction process when data is read from the NAND flash memory 2 according to this embodiment. In FIGS. 9A to 9E, in the second method according to this embodiment, the flow of the error correction process varies depending on whether the page to be read is the upper page, the middle page, or the lower page. Therefore, the processor 12 (or the memory interface 15) determines whether the page to be read is the page U, the page M, or the page L (Step S1 in FIG. 9A). Then, the error correction process is performed for each page according to the determination result.

In Step S1, when it is determined that the page to be read is the page U (Step S1: U), a reading operation is performed for boundary #3, as illustrated in FIG. 9C (Step S11). Specifically, the processor 12 (or the memory interface 15) instructs the NAND flash memory 2 to perform a reading operation using the value of boundary #3 as a determination voltage. Then, when the data of the upper page stored in the selected word line is read, the NAND flash memory 2 reads the data using the value of boundary #3 as the determination voltage applied to the word line. In this case, since the read data is saved in, for example, a buffer of the memory controller 1 or a page buffer of the NAND flash memory 2 such that it is used for the subsequent data synthesis (Step S12).

Then, a reading operation is performed using the value of boundary #7 as the determination voltage applied to the same selected word line (Step S13). Then, the processor 12 (or the memory interface 15) synthesizes the read data from boundary #3 and the read data from boundary #7 and generates the actual data of the page U (Step S14). In this case, a synthesis expression for obtaining the actual data is as follows:

Actual data=read data from boundary #3 +bar{read data from boundary #7}

(where bar{ } indicates the negation of { }).

The synthesis expression is the same as that in the example illustrated in FIG. 4. This is because the data of the page U does not include data to which data allocation by the second method is applied only with data allocation by the first method (the page U2 does not include any data).

Then, the processor 12 acquires data (user data and the parity data of parity storage area #1) required for error correction from the synthesized data (Step S15). In the case of the page U, the value read from parity storage area #2 is not needed. The processor 12 transmits the acquired data to the ECC circuit 14 and the ECC circuit 14 detects an error on the basis of the input data (Step S16) and determines whether there is an error (Step S17). When there is an error (Yes in Step S17), the processor 12 determines whether error correction is available (Step S18). When error correction is available (Yes in Step S18), data inversion is performed for all bits which are detected as an error to correct the error (Step S19). Then, the process ends.

When there is no error (No in Step S17), the process ends without performing error correction. When it is determined in Step S18 that error correction is not available (when the number of error bits is greater than the number of bits of ECC correction capability) (No in Step S18), the processor 12 notifies the outside that error correction is not available (Step S2 in FIG. 9B). Then, the process ends.

Figure 9A:
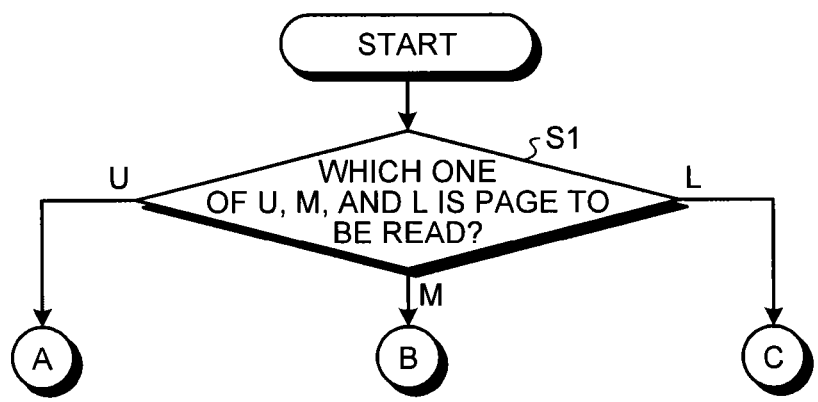
FIGS. 9A to 9E are flowcharts illustrating an example of an error correction process when data is read from the NAND flash memory according to this embodiment.
Figure 9B:
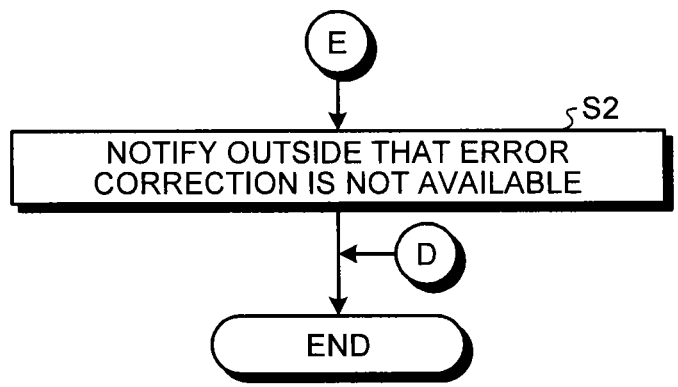
Figure 9C:
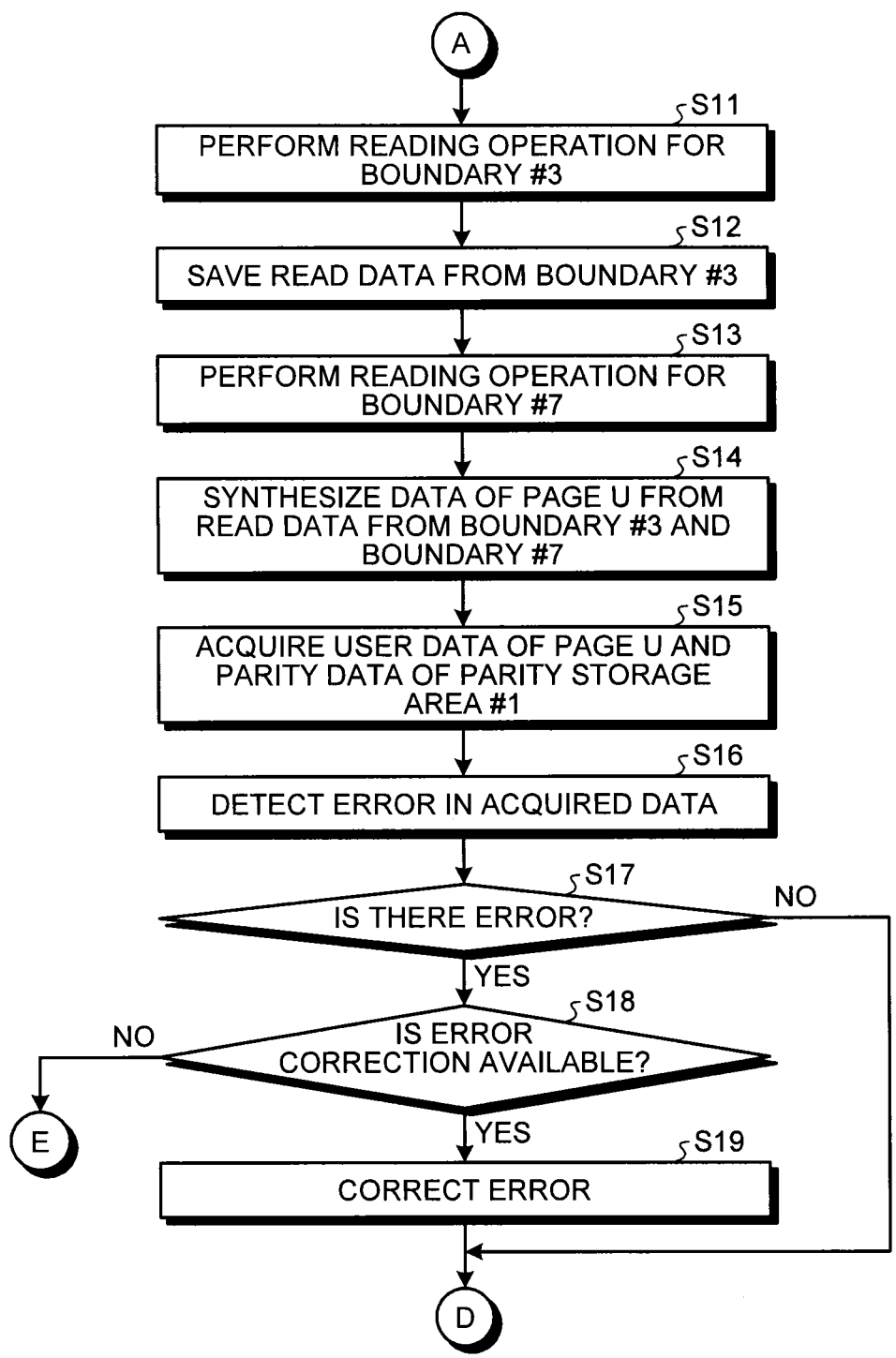
Figure 9D:
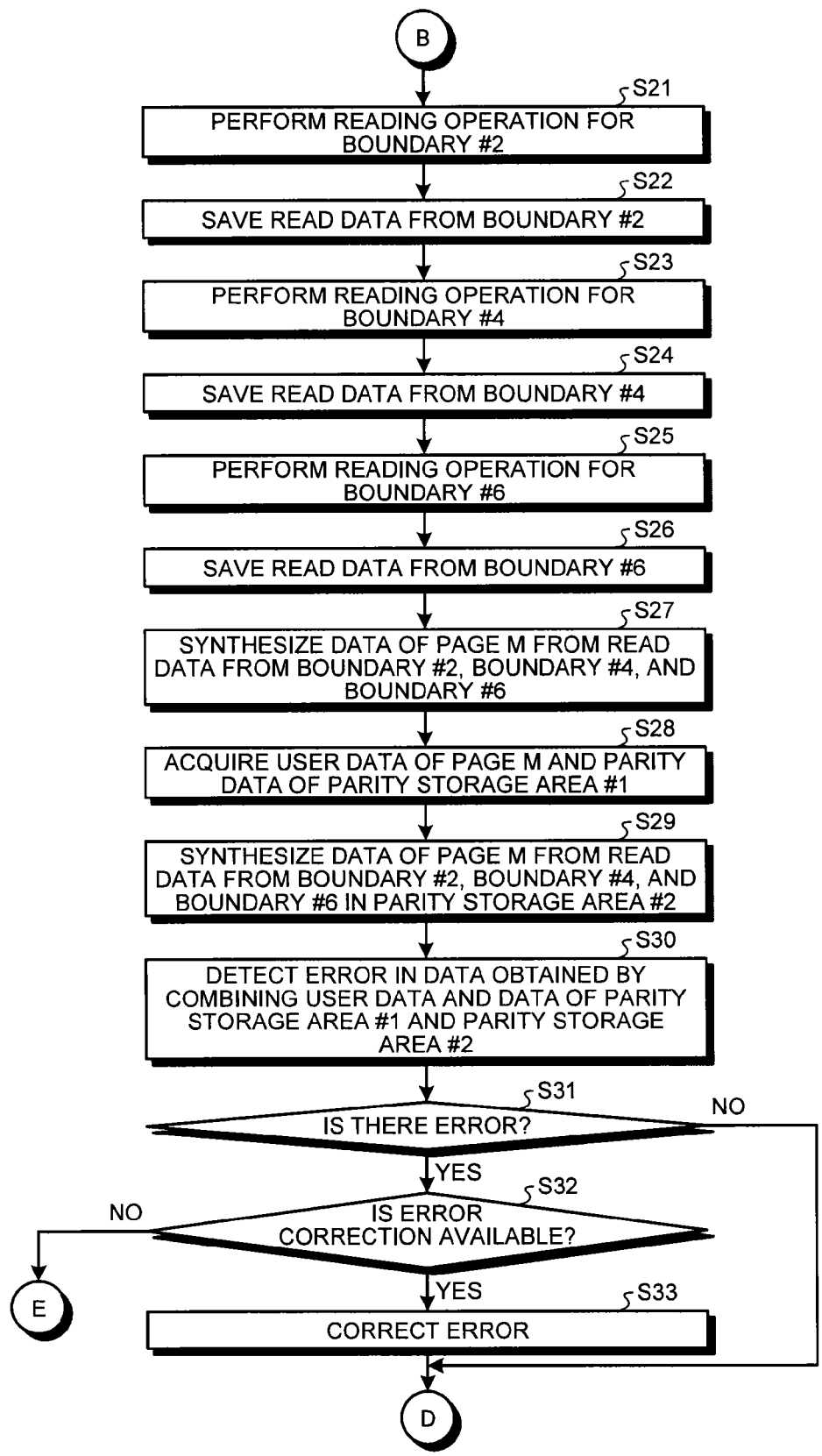

When it is determined in Step S1 of FIG. 9A that the page to be read is the page M (Step S1: M), the reading operation is performed for boundary #2, as illustrated in FIG. 9D (Step S21). In this case, the read data is saved in, for example, the buffer of the memory controller 1 or the page buffer of the NAND flash memory 2 (Step S22).

Then, the reading operation is performed using the value of boundary #4 as the determination voltage applied to the same selected word line (Step S23). In this case, similarly, the read data is saved in, for example, the buffer of the memory controller 1 or the page buffer of the NAND flash memory 2 (Step S24)

Then, the reading operation is performed using the value of boundary #6 as the determination voltage applied to the same selected word line (Step S25). In this case, similarly, the read data is saved in, for example, the buffer of the memory controller 1 or the page buffer of the NAND flash memory 2 (Step S26).

Then, the processor 12 (or the memory interface 15) synthesizes the read data from boundary #2, the read data from boundary #4, and the read data from boundary #6 to generate the actual data of the page M for a portion to which no data is allocated by the first method (Step S27). In this case, a synthesis expression for obtaining the actual data is as follows:

Actual data=(boundary #2 +boundary #4) □ boundary #6.

In the above-mentioned expression and the following expressions, the "read data from boundary #n (n=1, 2, ..., 7)" is abbreviated to "boundary #n". Since the actual data calculated by the above-mentioned expression is a portion corresponding to data allocation by the first method, the synthesis expression is the same as that in the example illustrated in FIG. 4.

The processor 12 acquires data (user data and the parity data of parity storage area #1=data stored by the first method) from the synthesized actual data (Step S28).

Then, the actual data (data of virtual 2 bits/cell of the page M2) of a portion (parity storage area #2) to which data is allocated by the second method is synthesized on the basis of the read data. In this case, when 2 bits actual data is ($M2_1$, $M2_0$), a synthesis expression is as follows:

Actual data ($M2_1$, $M2_0$)=((boundary #2+bar{boundary #6}), boundary #4).

Next, the user data and the parity storage area #1 acquired in Step S28 and the data of the parity storage area #2 are integrated with each other, the integrated data is transmitted to the ECC circuit 14, and the ECC circuit 14 detects an error on the basis of the input data (Step S30). Then, the ECC circuit 14 determines whether there is an error (Step S31). When there is an error (Yes in Step S31), the ECC circuit 14 determines whether error correction is available (Step S32). When error correction is available (Yes in Step S32), data inversion is performed for all bits which are detected as an error to correct the error (Step S33). Then, the process ends.

When there is no error (No in Step S31), the process ends without performing error correction. When it is determined in Step S32 that error correction is not available (when the number of error bits is more than the number of bits of ECC correction capability) (No in Step S32), the processor 12 notifies the outside that error correction is not available (Step S2 in FIG. 9B). Then, the process ends.

Figure 9E:
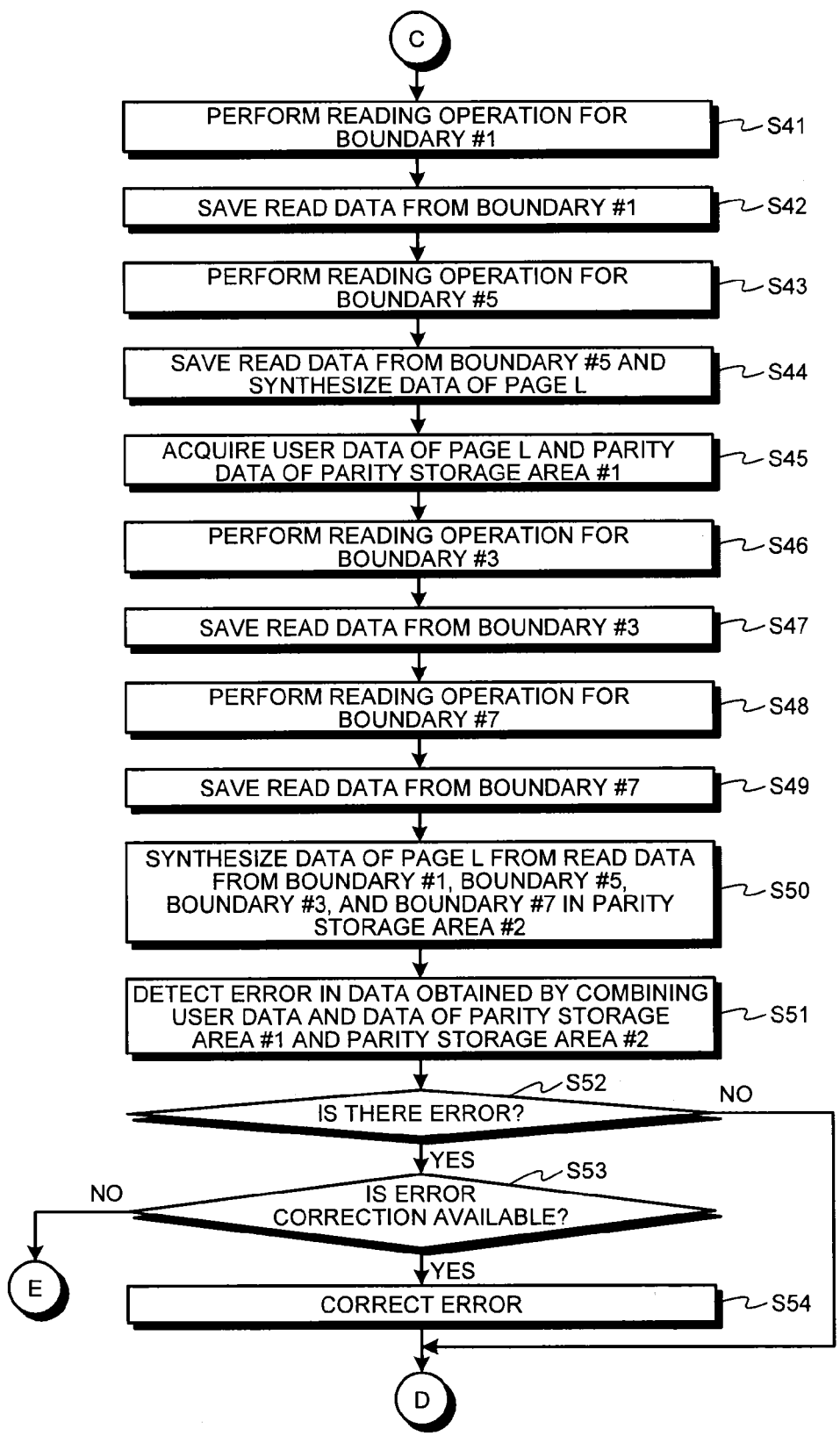

When it is determined in Step S1 of FIG. 9A that the page to be read is the page L (Step S1: L), the reading operation is performed for boundary #1, as illustrated in FIG. 9E (Step S41). In this case, the read data is saved in, for example, the buffer of the memory controller 1 or the page buffer of the NAND flash memory 2 (Step S42).

Similarly, the reading operation is performed for boundary #5 (Step S43) and the read data from boundary #1 and the read data from boundary #5 are synthesized with each other (Step S44) to generate the actual data of the page L to which no data is allocated by the first method. In this case, a synthesis expression for obtaining the actual data is as follows:

Actual data=(boundary #1+bar{boundary #5}).

Since this is the data allocation by the first method, the synthesis expression is the same as that in the example illustrated in FIG. 4. The processor acquires necessary data (user data and the parity data of parity storage area #1=data stored by the first method) from the synthesized actual data and stores the necessary data (Step S45).

Then, the reading operation is performed using the value of boundary #3 as the determination voltage applied to the same selected word line (Step S46) and the read data is saved (Step S47). Then, the reading operation is performed using the value of boundary #7 as the determination voltage applied to the same selected word line (Step S48) and the read data is saved (Step S49). Then, the processor 12 synthesizes the actual data of the page L2 in parity storage area #2 to which no data is allocated by the second method (Step S50). In this case, a synthesis expression for obtaining the actual data is as follows:

Actual data=(boundary #1+bar{boundary #5}) XOR (boundary #3+bar{boundary #7})

(where XOR indicates exclusive OR).

The processor 12 acquires necessary data (user data, the parity data of parity storage area #1, and the parity data of parity storage area #2) from the data acquired in Step S45 and the data synthesized in Step S50 and transmits the acquired data to the ECC circuit 14, and the ECC circuit 14 detects an error on the basis of the input data (Step S51). Then, the ECC circuit 14 determines whether there is an error (Step S52). When there is an error (Yes in Step S52), the ECC circuit 14 determines whether error correction is available (Step S53). When error correction is available (Yes in Step S53), data inversion is performed for all bits which are detected as an error to correct the error (Step S54). Then, the process ends.

When there is no error (No in Step S52), the process ends without performing error correction. When it is determined in Step S53 that error correction is not available (when the number of error bits is more than the number of bits of ECC correction capability) (No in Step S53), the processor 12 notifies the outside that error correction is unavailable (Step S2 in FIG. 9B). Then, the process ends.

FIG. 10 is a flowchart illustrating an example of a process of writing data to the NAND flash memory 2 according to this embodiment. In this embodiment, the ECC circuit 14 generates the parity of each page on the basis of data which will be written and corresponds to three pages. Data to be written to parity storage area #2 to which data allocation by the second method is applied is generated from the corresponding parity data by conversion using the above-mentioned conversion table. Then, the user data to which the data allocation by the first method is applied, the parity data of parity storage area #1, data (converted data) to be written to parity storage area #2 are used as final write data.

Specifically, as illustrated in FIG. 10, first, the processor 12 transmits the user data to be written to the page U, the page M, and the page L to the ECC circuit 14 and the ECC circuit 14 generates the parity of each page (Steps S61, S62, and S63). In this case, the sizes of the generated parities are predetermined and different from each other, as described below.

The size (first size) of the U parity=the number of cells in parity storage area #1, The size (second size) of the M parity=the number of cells in parity storage area #1 +(the number of cells in parity storage area #2) □ 2, and The size (third size) of the L parity=the number of cells in parity storage area #1+the number of cells in parity storage area #2.

Then, the processor 12 divides parity data (that is, data that is two times more than the number of cells (size) in parity storage area #2) more than the number of cells in parity storage area #1 in the M parity in the unit of 2 bits to generate 2-bit data groups, and converts the 2-bit data group and the L parity (1 bit) greater than the size of parity storage area #1 to generate data to be actually written to three pages (Step S64). The conversion table illustrated in FIG. 8 is used for the conversion.

The processor 12 combines the user data to be written to the page U, and data corresponding to the size of parity storage area #1 and the converted data of the page U in parity storage area #2 in the U parity with a first size to generate write data corresponding to one page for the page U (Step S65).

The processor 12 combines the user data to be written to the page M, and data corresponding to the size of parity storage area #1 and the converted data of the page M in parity storage area #2 in the M parity with a second size to generate write data corresponding to one page for the page M (Step S66).

The processor 12 combines the user data to be written to the page L, and data corresponding to the size of parity storage area #1 and the converted data of the page L in parity storage area #2 in the L parity with a third size to generate write data corresponding to one page for the page L (Step S67).

The processor 12 controls the memory interface 15 such that an operation of writing the generated data corresponding to three pages U, M, and L is performed (Step S68). Then, the process ends.

Figure 11:
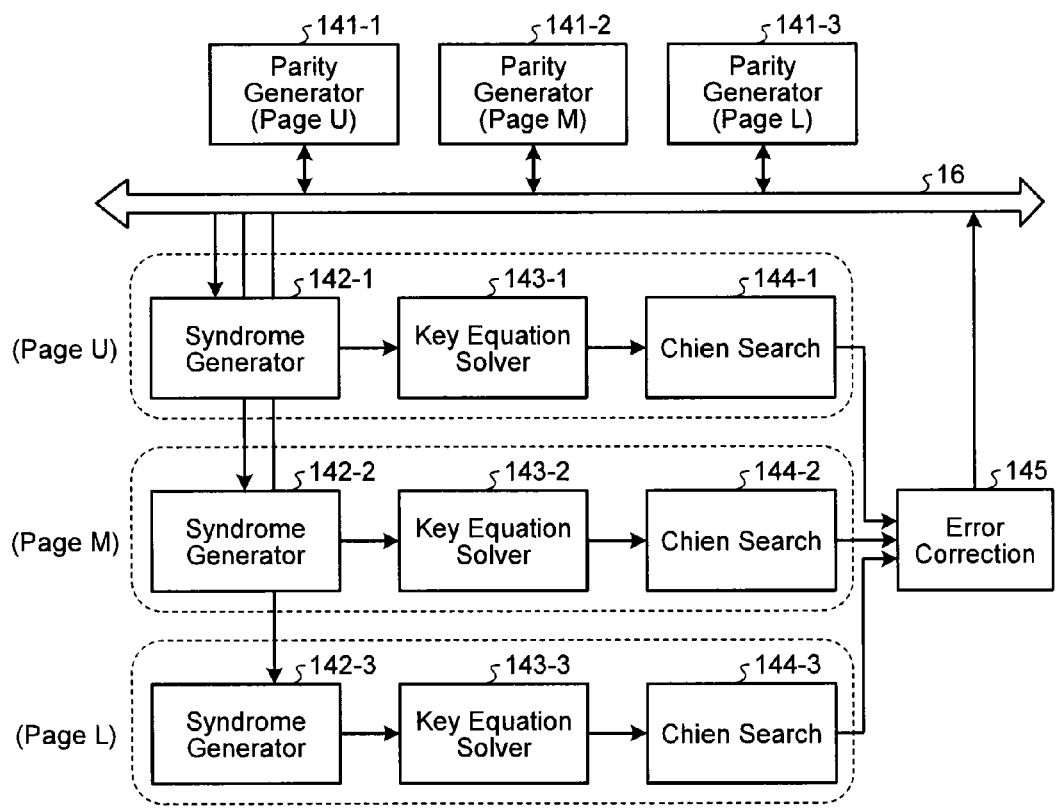
FIG. 11 is a diagram illustrating an example of the structure of the ECC circuit according to the first embodiment.

FIG. 11 is a diagram illustrating an example of the structure of the ECC circuit 14 according to this embodiment. In this example, in order to detect an error due to parities with different sizes, the ECC circuit 14 includes syndrome generation circuits (syndrome generators 142-1 to 142-3) corresponding to the parity sizes of the pages U, M, and L, error position polynomial calculating circuits (key equation solvers 143-1 to 143-3), and Chien search circuits (Chien search units 144-1 to 144-3). In addition, for the generation of the parities, the ECC circuit 14 includes parity generation units (parity generators 141-1 to 141-3) for each page in order to generate parities with different sizes. The structure illustrated in FIG. 11 is an illustrative example and each component may not be provided for each page, but a set of components may process all pages.

Next, the advantages of this embodiment when the data allocation, the method of storing data in the memory, and the read, ECC correction, and writing operations are performed using the data allocation and the method will be described. The number of boundaries of the page M with the largest parity data size including the parity data stored as the page M2 in parity storage area #2 is 3, which is the same as that in the example as illustrated in FIG. 4. This means that, in the example illustrated in FIG. 4, even though a data size equal to or more than the size of one page can be stored in the page M, reading only one page M is equivalent to acquiring all data and there is no reduction in reading speed. In the method illustrated in FIG. 4, data more than the size of one page is stored in other pages. Therefore, in order to acquire all data, it is necessary to read other pages. The number of boundaries of the page M is 3, which is one more than that of the page U and the page L, and the reading speed is low. In the example illustrated in FIG. 4, the total number of boundaries is 7. Even though only one of the pages U and L is used to store the M parity, the number of boundaries is 5. As such, when the M parity is stored in other pages as in the related art, at least a total of 5 boundaries are used to read the page M, which results in a significant reduction in reading speed.

For the page L, the number of boundaries required for reading is 4 in order to read parity data as the page L2 stored in parity storage area #2. As a result, the reading speed of the page L is lower than that in the related art. However, while the worst number of boundaries is 7 (page M) in the related art, the worst number of boundaries is reduced to 4 in this embodiment. Therefore, it is possible to prevent a reduction in reading speed as a whole.

Second Embodiment

Figure 12:
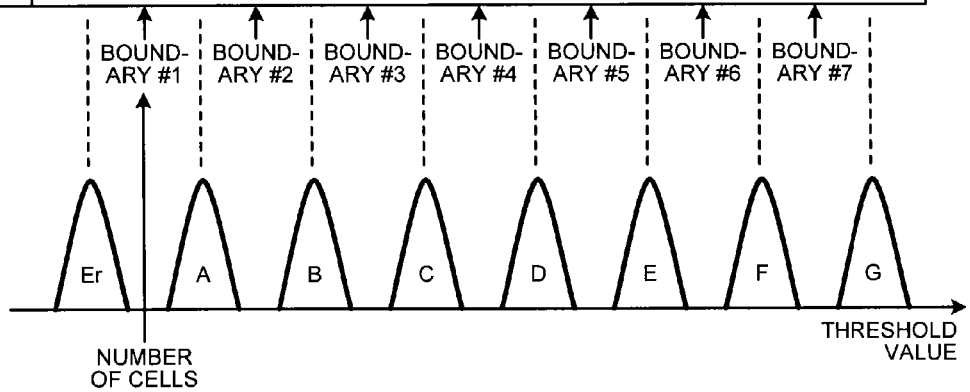
FIG. 12 is a diagram illustrating an example of data allocation by a third method in a NAND flash memory according to a second embodiment.

FIG. 12 is a diagram illustrating an example of data allocation by a third method in a NAND flash memory 2 according to a second embodiment. A semiconductor memory system according to this embodiment has the same structure as that according to the first embodiment. In the first embodiment, the second method is used to perform data allocation to virtually allocate a portion of the parity of the page L to the page M, thereby increasing the amount of parity of the page M. However, in this embodiment, the third method is also used to perform data allocation to virtually allocate a portion of the parity of the page U in addition to the page L to the page M. In the second embodiment, the difference from the second method is that no data is allocated to a new page L3, which is a page of 2 bits/cell, in the third method, and the new page U3 in the third method is unary data with four boundaries.

Figure 13:
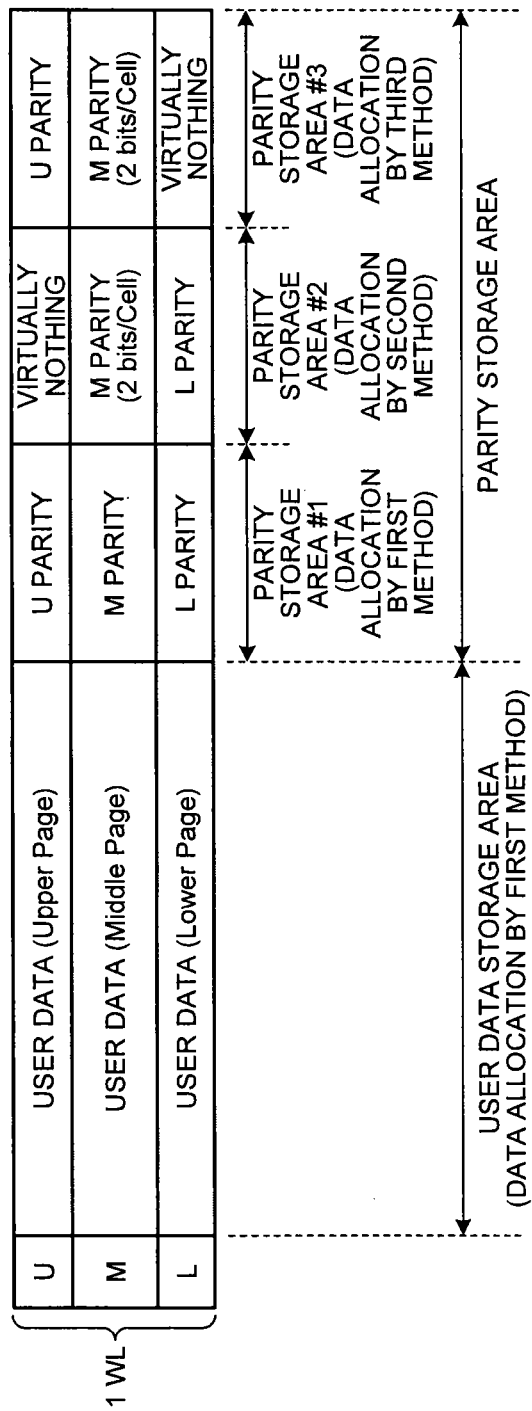
FIG. 13 is a diagram illustrating an example of the storage of data in the NAND flash memory according to a second embodiment.

FIG. 13 is a diagram illustrating an example of the storage of data in the NAND flash memory 2 according to the second embodiment. The size of data which can be stored in a parity area for a page M is the largest and the parity data sizes for a page L and a page U are determined according to the sizes of parity storage area #2 and parity storage area #3.

As illustrated in FIG. 13, in this embodiment, the parity storage area is divided into three parity storage areas, that is, parity storage area #1, parity storage area #2, and parity storage area #3 and data is allocated to parity storage area #1 and parity storage area #2 by the first and second methods described in the first embodiment, respectively. Data is allocated to parity storage area #3 by the third method. There is virtually no parity data in parity storage area #3 of the page L and parity data corresponding thereto is used such that the page M is 2 bits/cell.

Figure 14:
FIG. 14 is a diagram illustrating an example of a data conversion table for writing data to parity storage area #2 and parity storage area #3 in the second embodiment.

FIG. 14 is a diagram illustrating an example of a data conversion table for writing data to parity storage area #2 and parity storage area #3 according to this embodiment. In this embodiment, when data is written to the NAND flash memory 2, data allocation is converted from middle data allocation to data allocation for parity storage area #2 and is converted from upper data allocation to lower data allocation for parity storage area #3. Then, data is written.

Figure 15A:
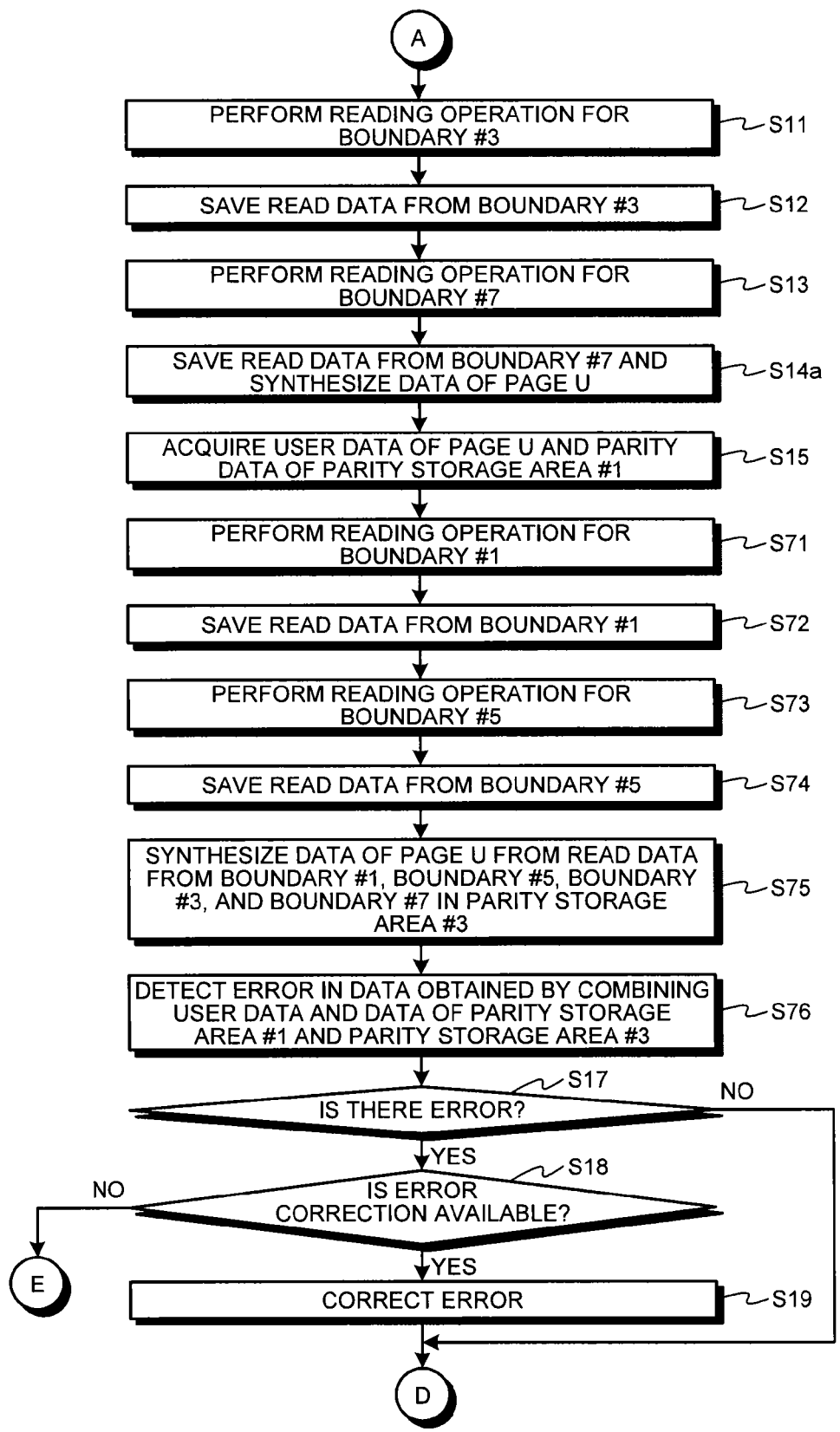
Figure 15C:
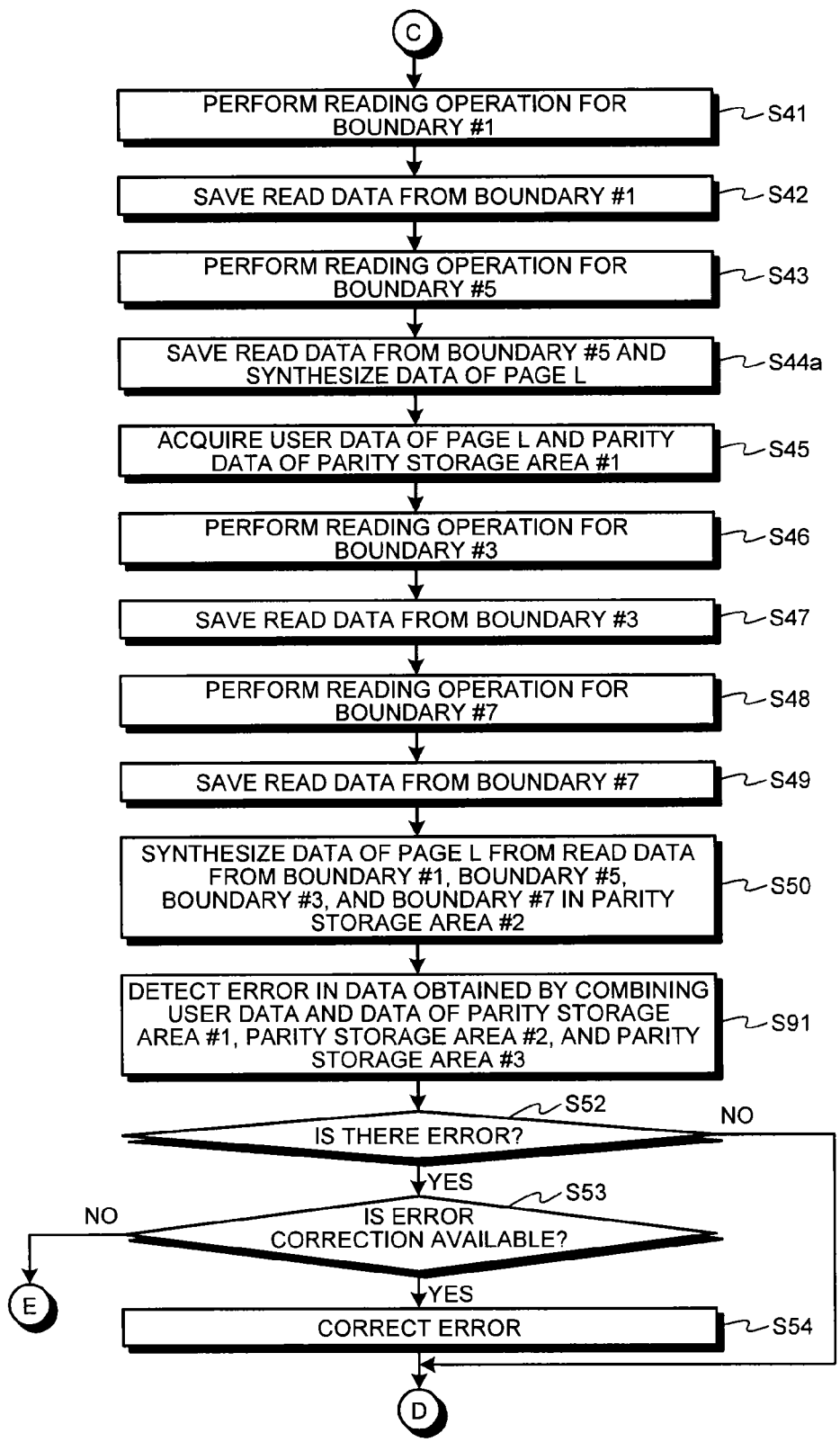

FIGS. 15A to 15C are flowcharts illustrating an example of an error correction process when data is read from the NAND flash memory 2 according to this embodiment. In this embodiment, similarly to the first embodiment, since the flow varies depending on whether the page to be read is an upper page (U), a middle page (M), or a lower page (L), first, it is determined whether the page to be read is the upper page, the middle page, or the lower page (Step S1), which is not illustrated since the step is the same as that in FIG. 9A in the first embodiment. In addition, since the end process is the same as that in FIG. 9B in the first embodiment, it is not illustrated.

In Step S1, when it is determined that the page to be read is the page U (Step S1: U), Steps S11 to S13 which are the same as those in the first embodiment are performed, as illustrated in FIG. 15A. After Step 13, the read data from boundary #7 is saved and the actual data of a portion of the page U to which data is allocated by the first method and the second method is synthesized on the basis of the read data from boundary #3 and boundary #7, similarly to Step S14 in the first embodiment (Step S14a). The read data from boundary #3 and boundary #7 saved in Step S12 and Step S14a is maintained so as to be used for the subsequent synthesis. Then, similarly to the first embodiment, Step S15 is performed.

Then, a reading operation is performed for boundary #1 (Step S71) and the read data is saved (Step S72). The reading operation is performed for boundary #5 (Step S73) and the read data is saved (Step S74).

Then, the processor 12 synthesizes the actual data of the parity storage area #3 of the page U on the basis of the read data from boundary #1, boundary #5, boundary #3, and boundary #7 of parity storage area #3 to which data is allocated by the third method (Step S75). In this case, a synthesis expression for obtaining the actual data is follows:

Actual data=bar{(boundary #1+bar{boundary #5}) XOR (boundary #3+bar{boundary #7})}

Then, data obtained by combining the data (user data and the parity data of parity storage area #1) acquired in Step S15 and the parity data of parity storage area #3 synthesized in Step S75 is transmitted to the ECC circuit 14 and the ECC circuit 14 detects an error on the basis of the input data (Step S76). Then, Step S17 or the subsequent steps are performed, similarly to the first embodiment.

When it is determined in Step S1 that the page to be read is the page M (Step S1: M), the same Steps S21 to S29 as those in the first embodiment are performed, as illustrated in FIG. 15B. Then, the processor 12 synthesizes the actual parity data of the page M3 in parity storage area #3 to which data is allocated by the third method (Step S81). In this case, a synthesis expression for obtaining the actual data is as follows, which is the same as that for obtaining the actual data of parity storage area #2:

Actual data $(M3_1, M3_0)$=((boundary #2+bar{boundary #6}), boundary #4).

Then, data obtained by combining the data (user data and the parity data of parity storage area #1) acquired in Step S28 and the parity data of parity storage area #2 and parity storage area #3 synthesized in Steps S29 and S81 is transmitted to the ECC circuit 14 and the ECC circuit 14 detects an error on the basis of the input data (Step S82). Then, Step S31 and the subsequent steps are performed, similarly to the first embodiment.

When it is determined in Step S1 that the page to be read is the page L (Step S1: L), the same Steps 41 to S50 as those in the first embodiment are performed as illustrated in FIG. 15C. Then, data obtained by combining the data (user data and the parity data of parity storage area #1) acquired in Step S45 and the parity data of parity storage area #2 and the parity data (no data) of parity storage area #3 synthesized in Step S50 is transmitted to the ECC circuit 14 and the ECC circuit 14 detects an error on the basis of the input data (Step S91). Then, Step S52 and the subsequent steps are performed, similarly to the first embodiment.

FIG. 16 is a flowchart illustrating an example of the process of writing data to the NAND flash memory 2 according to this embodiment. In this embodiment, the ECC circuit 14 generates the parity of each page on the basis of data which will be written and corresponds to three pages. Data to be written to parity storage area #2 to which data allocation by the second method is applied is generated from the corresponding parity data by conversion using the conversion table illustrated in FIG. 14. Data to be written to parity storage area #2 to which data allocation by the third method is applied is generated from the corresponding parity data by conversion using the conversion table illustrated in FIG. 14. Then, the user data to which data allocation by the first method is applied, the parity data of parity storage area #1, data (converted data) to be written to parity storage area #2, and data (converted data) to be written to parity storage area #3 are used as final write data.

Specifically, as illustrated in FIG. 16, Steps S61 to S64 are performed. However, in this embodiment, the sizes of the U parity, the M parity, and the L parity are predetermined and different from each other, as described below:

The size (first size) of the U parity=the number of cells in parity storage area #1+the number of cells in parity storage area #3;

The size (second size) of the M parity=the number of cells in parity storage area #1+(the number of cells in parity storage area #2) ☐ 2+(the number of cells in parity storage area #3) ☐ 2; and The size (third size) of the L parity=the number of cells in parity storage area #1+the number of cells in parity storage area #2.

After Step S64, the processor 12 divides data (that is, data stored in parity storage area #3) that is two times more than the number of cells in parity storage area #3 in the M parity in the unit of 2 bits to generate 2-bit data groups, and converts the 2-bit data group and the U parity (1 bit) greater than the size of parity storage area #1 to generate data to be actually written to three pages (Step S101). The conversion table illustrated in FIG. 14 is used for the conversion.

The processor 12 combines the user data to be written to the page U, and data corresponding to the size of parity storage area #1, the converted data of the page U in parity storage area #2, and the converted data of the page U in parity storage area #3 in the U parity with a first size to generate write data corresponding to one page U (Step S102).

The processor 12 combines the user data to be written to the page M, and data corresponding to the size of parity storage area #1, the converted data of the page M in parity storage area #2, and the converted data of the page M in parity storage area #3 in the M parity with a second size to generate write data corresponding to one page M (Step S103).

The processor 12 combines the user data to be written to the page L, and data corresponding to the size of parity storage area #1, the converted data of the page L in parity storage area #2, and the converted data of the page L in parity storage area #3 in the L parity with a third size to generate write data corresponding to one page L (Step S104).

The processor 12 controls the memory interface 15 such that an operation of writing the generated data corresponding to three pages U, M, and L is performed (Step S105). Then, the process ends.

As compared with the first embodiment, this embodiment has the advantage that parity area is virtually allocated from the page U as well as the page L to the page M to improve the ECC correction capability of the page M. In this case, a reduction in the reading process of the page M does not occur, which is also the advantage of the first embodiment. In addition, for parity data as the page U3 stored in parity storage area #3, the number of boundaries is 4. As a result, the reading speed of the page U is reduced. However, similarly to the page L2 in the first embodiment, the number of boundaries is 4 and the worst reading speed is not reduced. That is, in this embodiment, it is possible to further improve the ECC correction capability of the page M, without reducing the worst reading speed, as compared to the first embodiment.

Third Embodiment

Figure 17:
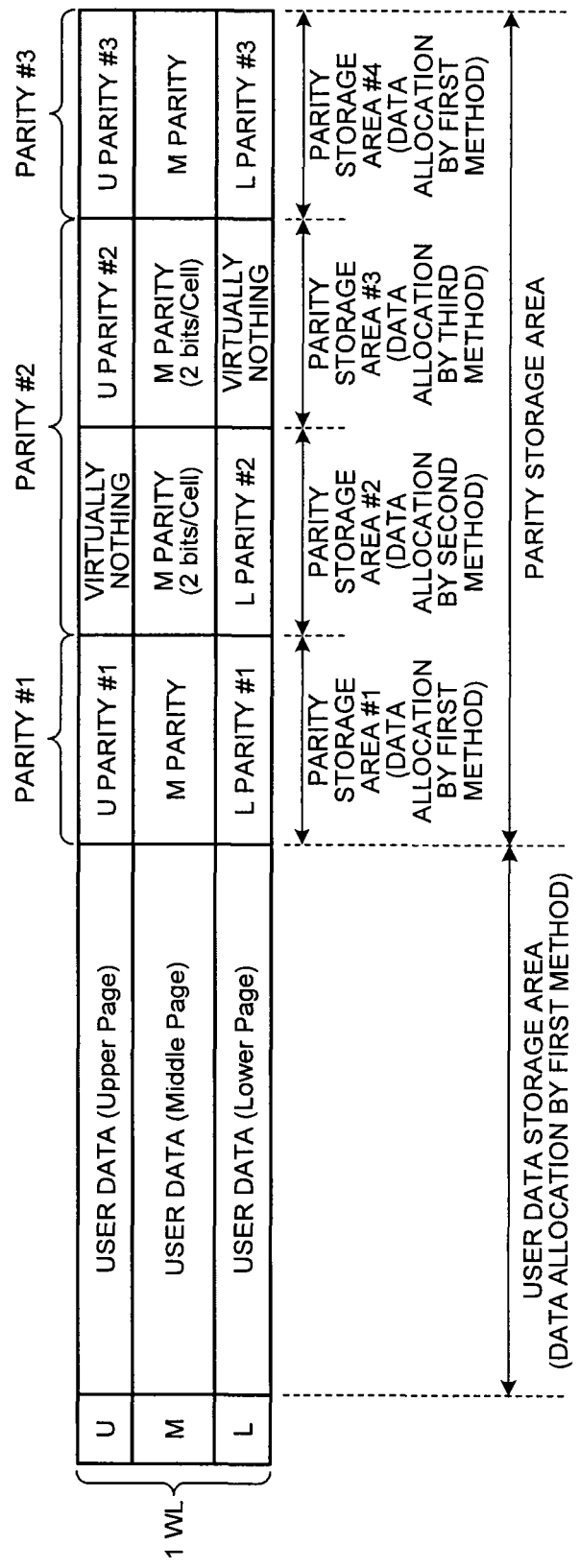
FIG. 17 is a diagram illustrating an example of the storage of data in a NAND flash memory according to a third embodiment.

FIG. 17 is a diagram illustrating an example of the storage of data in a NAND flash memory 2 according to a third embodiment. A semiconductor memory system according to this embodiment has the same structure as that according to the first embodiment. In the first and second embodiments, the pages have different parity sizes, all data is read during a reading operation, the synthesis of the actual data is performed, and ECC correction is performed. In addition, during a writing operation, parities with each size are generated. However, in this embodiment, a multi-stage error correction method is applied to parities in parity storage area #1 and parity storage area #2 of a page L or parities in parity storage area #1 and parity storage area #3 of a page U, which makes it possible to prevent a reduction in the practical reading speed.

In this embodiment, the multi-stage error correction method does not independently perform coding in each stage, but adopts a generation polynomial selection method (a generation polynomial used to generate an i-th parity (i is an integer equal to or greater than 1 and equal to or less than n) is selected on the basis of a generation polynomial used to generate the first to (i−1)-th parities) disclosed in Japanese Patent Application No. 2012-061692. Japanese Patent Application No. 2012-061692 is incorporated by reference herein.

Figure 18:
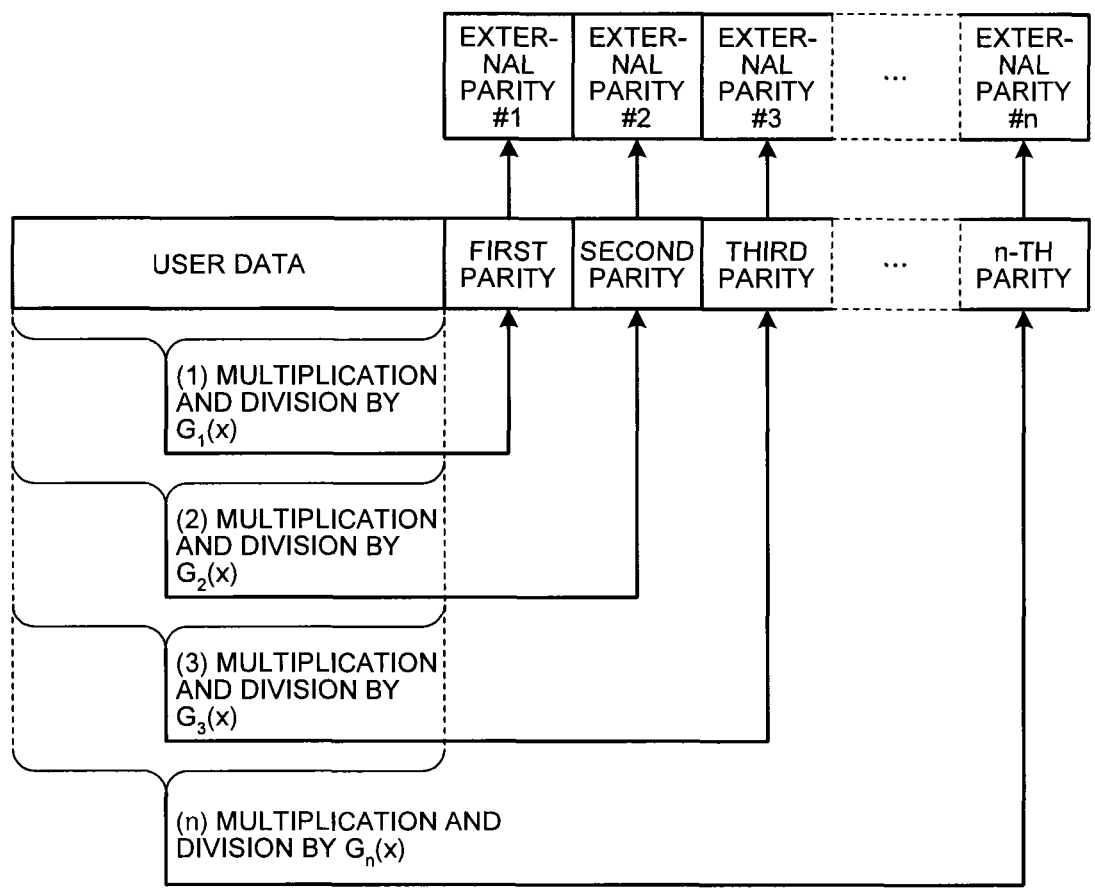
FIG. 18 is a diagram illustrating an example of the generation of parities by a multi-stage error correction method.

FIG. 18 is a diagram illustrating an example of the generation of parities by the multi-stage error correction method. In Japanese Patent Application No. 2012-061692, as illustrated in FIG. 18, a generation polynomial $G_1(x)$ is used to generate a first parity, which is a parity in a first stage, and a generation polynomial $G_2(x)$ is used to generate a second parity, which is a parity in a second stage. Similarly, a generation polynomial $G_n(x)$ is used to generate an n-th parity, which is a parity in an n-th stage. The generation polynomial $G_i(x)$ is generated on the basis of $G_1(x), G_2(x), \ldots, G_{i-1}(x)$. In addition, as illustrated in FIG. 18, external parity #1, external parity #2, ..., external parity #n, which are parities (hereinafter, referred to as external parities) corresponding to the first parity, the second parity, ..., the n-th parity, are generated.

As such, when the multi-stage error correction method is used to generate the parities, it is possible to increase the amount of parity which is used in stages according to the amount of error during decoding. Specifically, first, the first parity and external parity #1 are used to perform ECC correction for the first parity and user data and the first parity subjected to ECC correction are used to perform ECC correction for the user data. When ECC correction is available, it is not necessary to use the second parity or the subsequent parities. When ECC correction using the first parity is not available, ECC correction is performed for the second parity using the second parity and external parity #2 in addition to the first parity and the user data and the second parity subjected to ECC correction are used to perform ECC correction for the user data. When ECC correction is available, it is not necessary to use the third parity or the subsequent parities. For example, when the correction capability of the first parity is A bits and the correction capability of the second parity is B bits, the error correction capability of the second stage in which a combination of the first parity and the second parity is used is A+B bits.

The generation of the parities by the multi-stage error correction method makes it possible to reduce the amount of parity to be read when there is a small amount of error. Therefore, it is possible to prevent a reduction in reading speed.

In the example illustrated in FIG. 18, external parity #1, external parity #2, ..., external parity #n are generated for all of the parties (the first parity, the second parity, ..., the n-th parity) generated by the multi-stage error correction method. However, the external parities are generated in order to speed up the ECC correction process and the external parities do not need to be generated for all of the parities generated by the multi-stage error correction method according to the processing speed. In particular, for the parity (first parity) in the first stage, even when the external parity is not used, the processing speed does not matter. The external parity may not be generated for the parity (first parity) in the first stage.

In the example illustrated in FIG. 17, the multi-stage error correction method is applied to the page U and the page L to generate parities in two stages. The external parity is not generated for the parity in the first stage, but is generated for the parity in the second stage. Specifically, U parity #1 and L parity #1 illustrated in FIG. 17 are the parities in the first stage generated by the multi-stage error correction method and U parity #2 and L parity #2 illustrated in FIG. 17 are the parities in the second stage generated by the multi-stage error correction method. In addition, U parity #3 and L parity #3 illustrated in FIG. 17 are the external parities for U parity #2 and L parity #2. Therefore, the sizes of U parity #3 and L parity #3 are determined by ECC strength capable of reliably performing error correction for U parity #2 and L parity #2. A portion of the M parity is stored in the page M in parity storage area #4. In addition, dummy data may be stored in the page M in parity storage area #4. For the page M, parities are generated similarly to the first and second embodiments, without applying the multi-stage error correction method.

As illustrated in FIG. 17, the parity storage area is divided into parity storage area #1 to parity storage area #4 and data is allocated to parity storage area #1 and parity storage area #4 by the first method described in the first embodiment and the second embodiment. Data is allocated to parity storage area #2 by the second method described in the first embodiment and the second embodiment and data is allocated to parity storage area #3 by the third method described in the first embodiment and the second embodiment.

When the parity generation and the data allocation illustrated in FIG. 17 are performed, for the page U and the page L, the parities (U parity #1 and L parity #1) in parity storage area #1 are used to perform ECC correction in the first stage. When errors can be corrected by the error correction, the ECC correction process ends. Since all data required for the ECC correction in the first stage is stored by data allocation by the first method, the number of boundaries is 2 or 3 according to the pages and the reading speed is high. When the correction of an error by the ECC correction in the first stage is unavailable, the boundary to be read is added to acquire the parities in parity storage area #2 or parity storage area #3 used for ECC correction in the second stage and the ECC correction in the second stage with high correction capability is performed. When there is a small amount of data error, it is possible to correct errors at a high speed using the ECC correction in the first stage with low correction capability and thus improve the reading speed.

In this embodiment, the multi-stage error correction method is applied to the example of the second embodiment in which the parity areas are allocated from both the page U and the page L to the page M. However, the application example of the multi-stage error correction method is not limited thereto. The multi-stage error correction method may be applied to any page. For example, when the parity area of the page L is divided as in the first embodiment, the multi-stage error correction method may be similarly applied to the page L. In addition, for example, the external parities may be generated for the parities (U parity #1 and L parity #1) in the first stage and may be stored in parity storage area #4 together with the external parities (U parity #3 and L parity #3) for the parities in the second stage. When the parity is appropriately divided, the multi-stage error correction method may also be applied to the page M. The page to which the multi-stage error correction method is applied is determined considering the reading speed, practical error occurrence probability, and error correction capability.

Figure 19A:
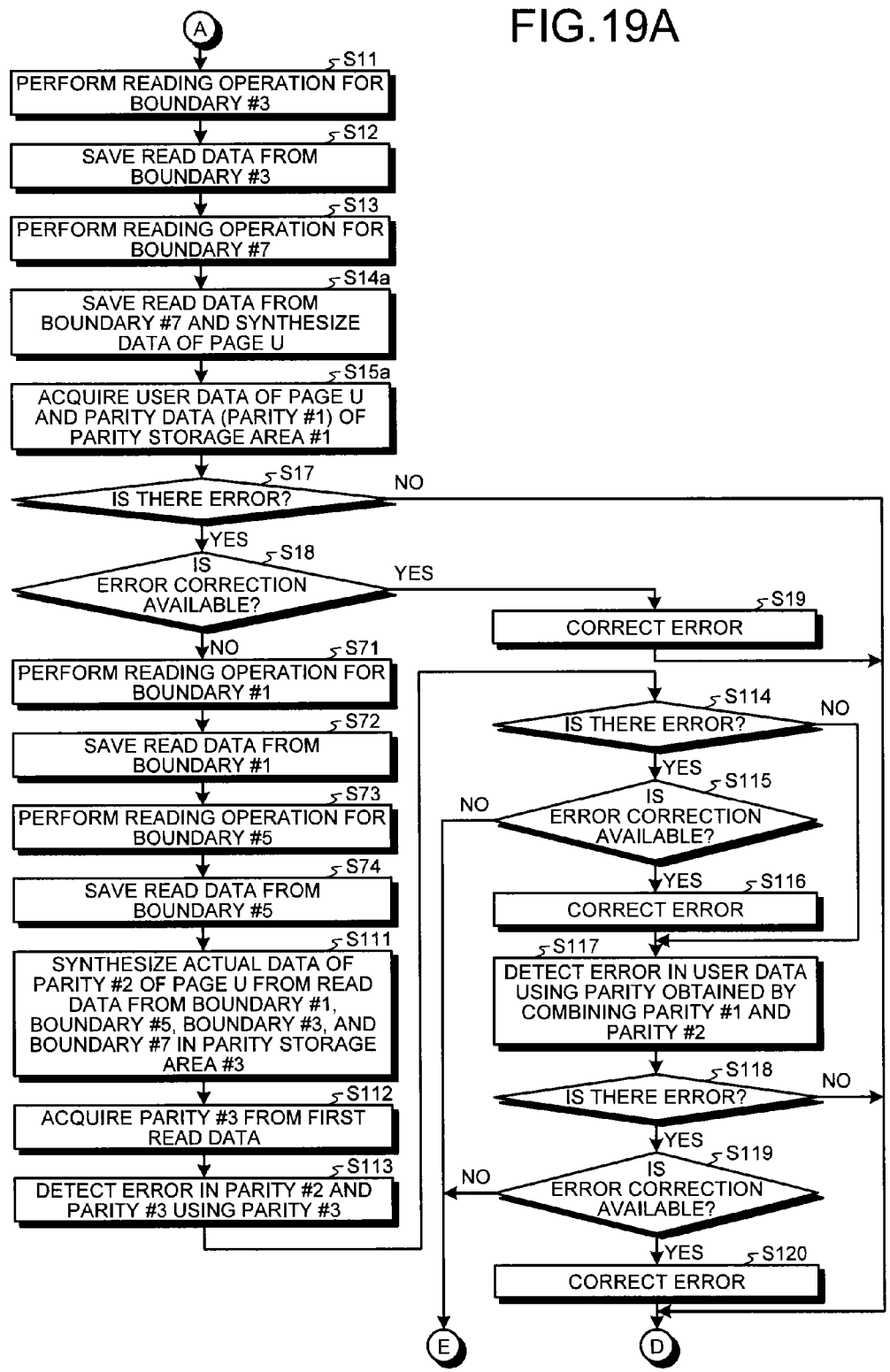
Figure 19B:
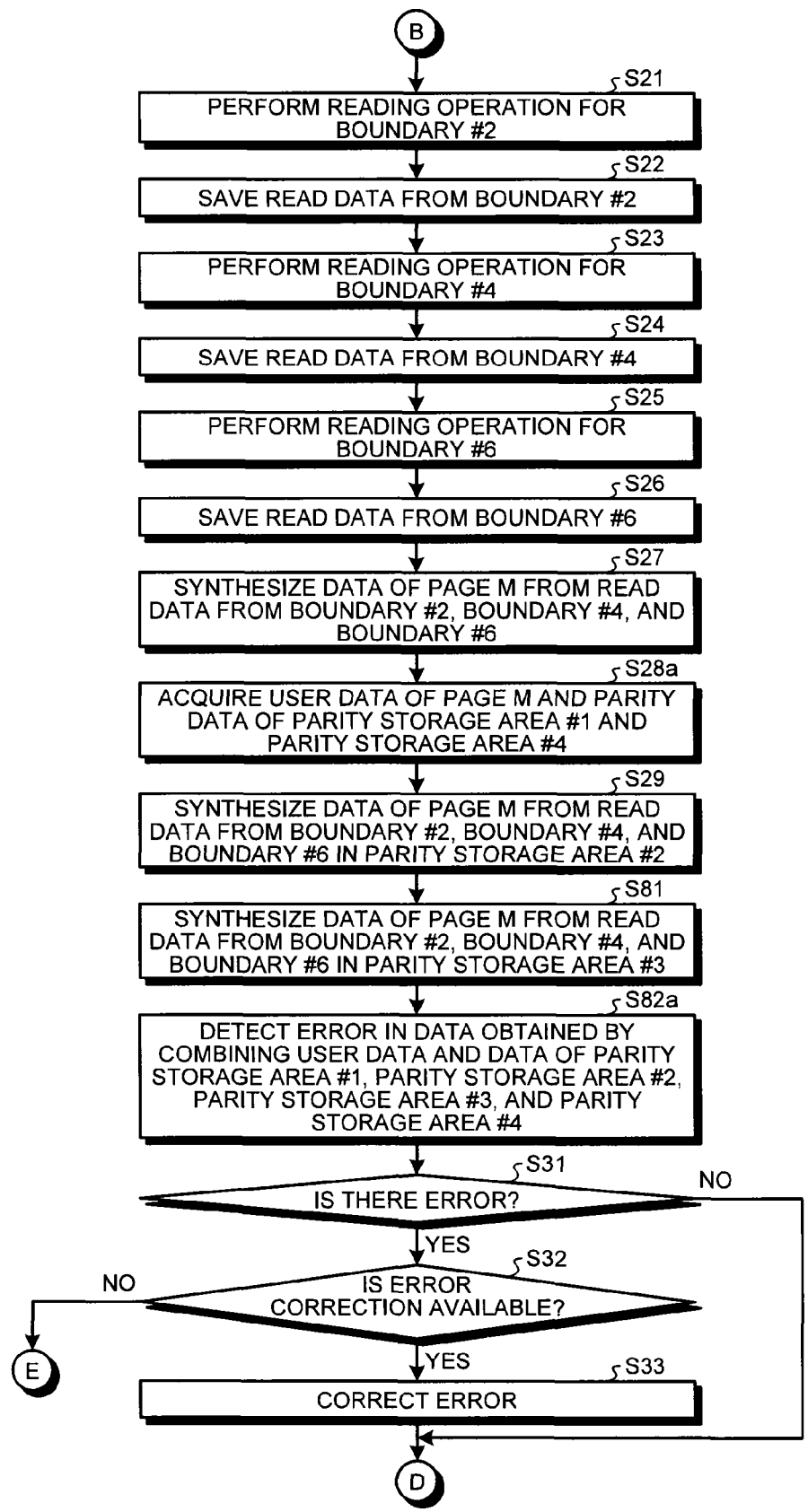

FIGS. 19A to 19C are flowcharts illustrating an example of an error correction process when data is read from the NAND flash memory 2 according to this embodiment. In this embodiment, similarly to the first embodiment, since the flow varies depending on whether the page to be read is an upper page, a middle page, or a lower page, first, it is determined whether the page to be read is the upper page, the middle page, or the lower page (Step S1), which is not illustrated since the step is the same as that in FIG. 9A in the first embodiment. In addition, since the end process is the same as that in FIG. 9B in the first embodiment, it is not illustrated.

In Step S1, when it is determined that the page to be read is the page U (Step S1: U), Steps S11 to S13 which are the same as those in the second embodiment are performed, as illustrated in FIG. 19A. After Step 13, read data from boundary #7 is saved and the actual data of a portion of the page U to which data is allocated by the first method and the second method is synthesized on the basis of the read data from boundary #3 and boundary #7, similarly to Step S14 in the first embodiment (Step 14a). The user data and the parity (U parity #1) of parity storage area #1 of the synthesized page U are acquired, the acquired data is transmitted to the ECC circuit 14, and the ECC circuit 14 detects an error on the basis of the input data (Step S15a).

Then, similarly to the first embodiment, Steps S17 to S19 are performed. In Step S18, when error correction is unavailable (No in Step S18), Steps S71 to S74 are performed similarly to the second embodiment. After Step S74, the read data from boundary #1, boundary #5, boundary #3, and boundary #7 in parity storage area #3 is used to synthesize the actual data of the page U (Step S111). In this case, a synthesis expression is the same as that used in Step S75.

Then, the processor 12 synthesizes parity #3 in parity storage area #4 on the basis of the data saved in Step S12 and Step S14a and acquires U parity #3 (Step S112). The processor 12 transmits U parity #3 and U parity #2 to the ECC circuit 14 and the ECC circuit 14 detects errors in U parity #2 and U parity #3 on the basis of the input data (Step S113).

It is determined whether there is an error (Step S114). When there is an error (Yes in Step S114), it is determined whether error correction is available (Step S115). When error correction is available (Yes in Step S115), data inversion is performed on all bits which are detected as an error to correct the error in U parity #2 (Step S116). The processor 12 transmits a parity obtained by combining U parity #2 subjected to error correction and U parity #1 and the user data to the ECC circuit 14 and the ECC circuit 14 detects an error in the user data on the basis of the input data (S117). Then, it is determined whether there is an error (Step S118). When there is an error (Yes in Step S118), it is determined whether error correction is available (Step S119). When error correction is available (Yes in Step S119), data inversion is performed on all bits which are detected as an error to correct errors in the user data (Step S120). Then, the process ends.

When it is determined in Step S114 that there is no error (No in Step S114), error correction is not performed and the process proceeds to Step 5117. When it is determined in Step S115 that error correction is not available (when the number of error bits is greater than the number of bits of ECC correction capability) (No in Step S115), the processor 12 notifies the outside that error correction is not available (Step S2 in FIG. 9B) and the process ends.

When it is determined in Step S118 that there is no error (No in Step S118), error correction is not performed and the process ends. When it is determined in Step S119 that error correction is not available (No in Step S119), the processor 12 notifies the outside that error correction is not available (Step S2 in FIG. 9B) and the process ends.

When it is determined in Step S1 that the page to be read is the page M (Step S1: M), the same Steps 21 to S27 as those in the second embodiment are performed, as illustrated in FIG. 19B. After Step S27, the processor 12 acquires necessary data (the user data, the parity data of parity storage area #1, and the parity data of parity storage area #4=data stored by the first method) from the synthesized actual data and stores the acquired data (Step S28a). Then, the same Steps S29 and S81 as those in the third embodiment are performed.

The processor 12 detects errors from data obtained by combining the user data and the parity data of parity storage area #1, parity storage area #2, parity storage area #3, and parity storage area #4 (Step S82a). Then, similarly to the first embodiment, Step S31 and the subsequent steps are performed.

When it is determined in Step S1 that the page to be read is the page L (Step S1: L), the same Steps 41 to S43 as those in the second embodiment are performed, as illustrated in FIG. 19C. After Step S43, the processor 12 saves the read data from boundary #5 and synthesizes the read data from boundary #1 and the read data from the boundary #5 (Step S44a). The processor 12 acquires necessary data (the user data and the parity data of parity storage area #1=data stored by the first method) from the synthesized actual data and transmits the acquired data to the ECC circuit 14, and the ECC circuit 14 detects errors on the basis of the input data (Step S45a).

Then, similarly to the second embodiment, Steps S52 to S54 are performed. When it is determined in Step S53 that error correction is not available (No in Step S53), Steps S46 to S49 are performed similarly to the second embodiment. After Step S49, the read data from boundary #1, boundary #5, boundary #3, and boundary #7 in parity storage area #2 is used to synthesize the actual data corresponding to L parity #2 (Step S121). In this case, a synthesis expression is the same as that used in Step S50.

Then, the processor 12 synthesizes parity #3 in parity storage area #4 on the basis of the data saved in Step S42 and Step S44a and acquires L parity #3 (Step S122). The processor 12 transmits L parity #3 and L parity #2 to the ECC circuit 14 and the ECC circuit 14 detects errors from L parity #2 and L parity #3 on the basis of the input data (Step S123).

It is determined whether there is an error (Step S124). When there is an error (Yes in Step S124), it is determined whether error correction is available (Step S125). When error correction is available (Yes in Step S125), data inversion is performed on all bits which are detected as an error to correct errors in L parity #2 (Step S126). The processor 12 transmits a parity obtained by combining L parity #2 subjected to error correction and L parity #1 and the user data to the ECC circuit 14 and the ECC circuit 14 detects errors in the user data on the basis of the input data (S127). Then, it is determined whether there is an error (Step S128). When there is an error (Yes in Step S128), it is determined whether error correction is available (Step S129). When error correction is available (Yes in Step S129), data inversion is performed on all bits which are detected as an error to correct the error in the user data (Step S130). Then, the process ends.

FIG. 20 is a flowchart illustrating an example of the process of writing data to the NAND flash memory 2 according to this embodiment. In this embodiment, the ECC circuit 14 generates the parity of each page (for the pages U and L, the parity in two stages and the external parity for the parity in the second stage) on the basis of data which will be written and corresponds to three pages. Data to be written to parity storage area #2 to which data allocation by the second method is applied is generated from the corresponding parity data by conversion using the conversion table illustrated in FIG. 14. Data to be written to parity storage area #2 to which data allocation by the third method is applied is generated from the corresponding parity data by conversion using the conversion table illustrated in FIG. 14. Then, the user data to which data allocation by the first method is applied, the parity data of parity storage area #1, data (converted data) to be written to parity storage area #2, data (converted data) to be written to parity storage area #3, and the parity data of parity storage area #4 to which data allocation by the first method is applied are used as final write data.

The sizes of the parities generated in this embodiment are as follows:

The size (first size) of U parity #1+U parity #2=the number of cells in parity storage area #1+the number of cells in parity storage area #3;

The size (second size) of M parity=the number of cells in parity storage area #1+(the number of cells parity storage area #2) □ 2+(the number of cells in parity storage area #3) □ 2+the number of cells in parity storage area #3;

The size (third size) of L parity #1+L parity #2=the number of cells in parity storage area #1+the number of cells in parity storage area #2; and The size (fourth size) of U parity #3 (=L parity #3)=the number of cells in parity storage area #4.

Specifically, as illustrated in FIG. 20, for the page U, the multi-stage error correction method is used to generate parities (2 stages) with a first size (Step S61a). Specifically, two parities, that is, U parity #1 and U parity #2, which are parities in the first stage, are generated, and the total size of U parity #1 and U parity #2 is the first size. Then, similarly to the first embodiment, for the page M, parities with a second size are generated (Step S62). For the page L, the multi-stage error correction method is used to generate parities (2 stages) with a third size (Step S63a). Specifically, two parities, that is, L parity #1 and L parity #2, which are parities in the first stage, are generated and the total size of L parity #1 and L parity #2 is the third size. Then, the ECC circuit 14 generates U parity #3 with a fourth size for the data (U parity #3) of parity storage area #3 of the page U (Step S131). In addition, the ECC circuit 14 generates L parity #3 with the fourth size for the data (L parity #3) of parity storage area #2 of the page L (Step S132).

The processor 12 combines the user data to be written to the page U, and data corresponding to the size of parity storage area #1, the converted data of the page U in parity storage area #2, the converted data of the page U in parity storage area #3, and U parity #3 with the fourth size in the U parity with the first size to generate write data corresponding to one page for the page U (Step S133).

The processor 12 combines the user data to be written to the page M, and data corresponding to the size of parity storage area #1, the converted data of the page M in parity storage area #2, the converted data of the page M in parity storage area #3, and the M parity with the fourth size in the M parity with the second size to generate write data corresponding to one page for the page M (Step S134).

The processor 12 combines the user data to be written to the page L, and data corresponding to the size of parity storage area #1, the converted data of the page L in parity storage area #2, the converted data of the page L in parity storage area #3, and L parity #3 with the fourth size in the L parity with the third size to generate write data corresponding to one page for the page L (Step S135).

The processor 12 controls the memory interface 15 such that an operation of writing the generated data corresponding to three pages U, M, and L is performed (Step S136). Then, the process ends.

In this embodiment, parity #3 (U parity #3 and L parity #3) is generated for the actual data (data before conversion) of parity #2 (U parity #2 and L parity #2). However, parities may be generated for data obtained by converting the data in parity storage area #2 and parity storage area #2 using data allocation by the first method.

In his embodiment, when error correction for parity #2 using the external parity is not available, error correction for the page is stopped, a notice indicating that error correction is not available is transmitted to the outside, and the process ends. However, when the processing speed is allowed in terms of practical use, error correction is not stopped, but the ECC process is continued. For example, error correction is performed again using parity #1, parity #2, and user data on the assumption that an error is also included in parity #2.

Fourth Embodiment

Next, a fourth embodiment will be described. A semiconductor memory system according to this embodiment has the same structure as that according to the first embodiment. In third embodiment, in order to prevent a reduction in the practical reading speed, the multi-stage error correction method is applied to add a parity, such as parity #3, for performing ECC correction for parity #2 such that a process can be performed on the assumption that no error is included in parity #2 (U parity #2 and L parity #2) during ECC correction in the second stage. In this way, a reduction in the processing speed during ECC correction in the second stage is prevented.

Since parity #2 is generally a small amount of data and has a small size, the probability of an error occurring in parity #2 is very low. Therefore, in this embodiment, parity #3 is not used and a process related to parity #3 is not provided from the third embodiment.

In this embodiment, a method of storing data for one word line in the non-volatile memory is the same as that in the second embodiment (FIG. 13).

Figure 21A:
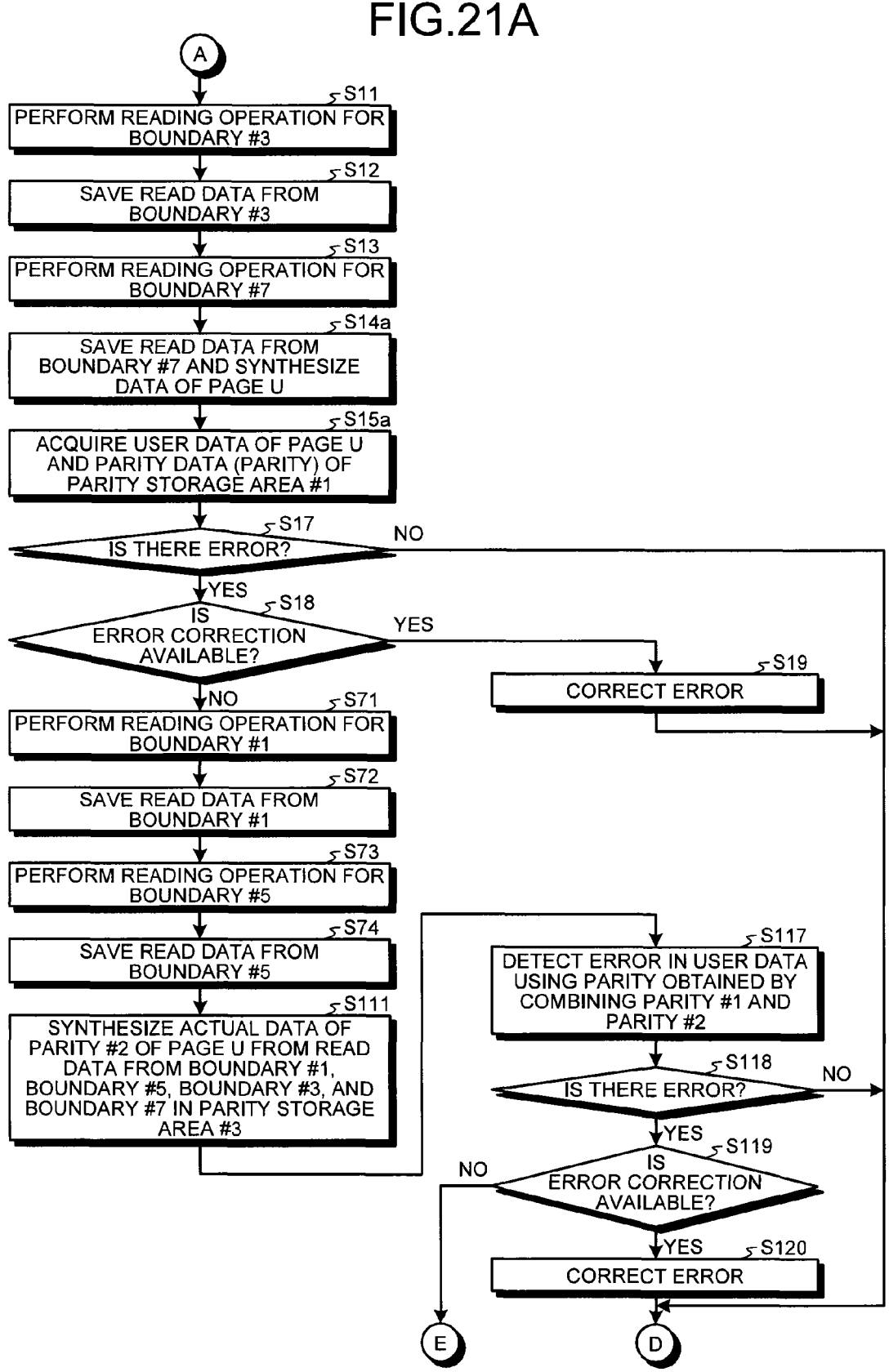
FIGS. 21A and 21B are flowcharts illustrating an error correction process when data is read from a NAND flash memory according to a fourth embodiment.
Figure 21B:
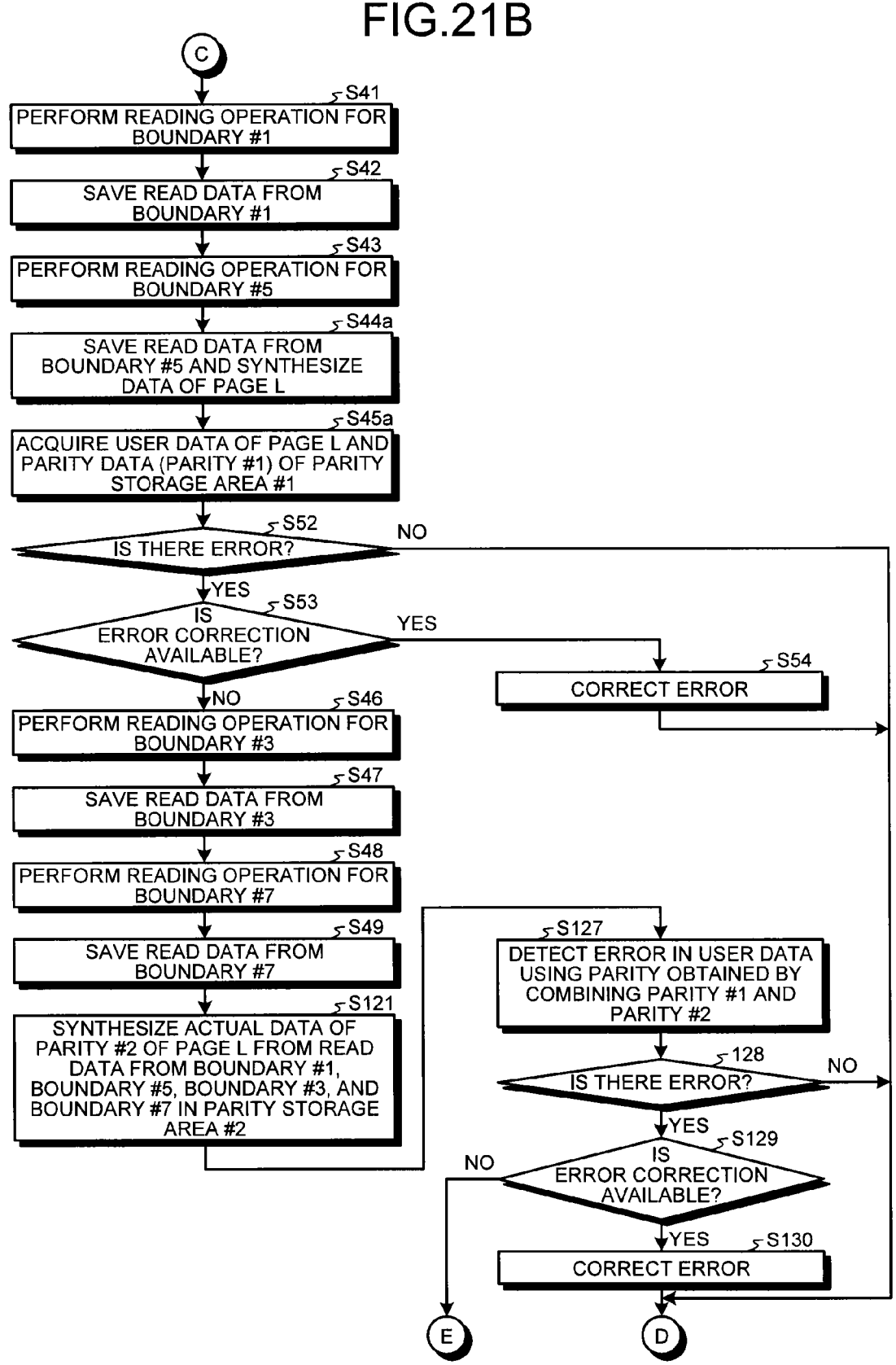

FIGS. 21A and 21B are flowcharts illustrating an example of an error correction process when data is read from a NAND flash memory 2 according to this embodiment. In this embodiment, similarly to the first embodiment, since the flow varies depending on whether the page to be read is an upper page, a middle page, or a lower page, first, it is determined whether the page to be read is the upper page, the middle page, or the lower page (Step S1), which is not illustrated since the step is the same as that in FIG. 9A in the first embodiment. In addition, since the end process is the same as that in FIG. 9B in the first embodiment, it is not illustrated.

When it is determined in Step S1 that the page to be read is the page U (Step S1: U), the process illustrated in FIG. 21A is performed. The process illustrated in FIG. 21A is similar to the process illustrated in FIG. 19A in the third embodiment except that Steps S112 to Step S116 are excluded and the description of the same portions as those in the third embodiment will not be repeated. However, an ECC process (Step S117) in the second stage is performed on the assumption that there is no error in U parity #2.

When it is determined in Step S1 that the page to be read is the page M (Step S1: M), the same process as that illustrated in FIG. 15B in the second embodiment is performed.

When it is determined in Step S1 that the page to be read is the page L (Step S1: L), the process illustrated in FIG. 21B is performed. The process illustrated in FIG. 21B is similar to the process illustrated in FIG. 19C in the third embodiment except that Steps S112 to S116 are excluded and the description of the same portions as those in the third embodiment will not be repeated. However, the ECC process (Step S127) in the second stage is performed on the assumption that there is no error in U parity #2.

FIG. 22 is a flowchart illustrating an example of a process of writing data to the NAND flash memory 2 according to this embodiment. In Steps S61a, S62, S63a, S64, and S65 illustrated in FIG. 22 are the same as those in the third embodiment. After Step S65, the processor 12 combines the user data to be written to the page U, and data corresponding to the size of parity storage area #1, the converted data of the page U in parity storage area #2, and the converted data of the page U in parity storage area #3 in a U parity with a first size to generate write data corresponding to one page for the page U (Step S141).

The processor 12 combines the user data to be written to the page M, and data corresponding to the size of parity storage area #1, the converted data of the page M in parity storage area #2, and the converted data of the page M in parity storage area #3 in an M parity with a second size to generate write data corresponding to one page for the page M (Step S142).

The processor 12 combines the user data to be written to the page L, and data corresponding to the size of parity storage area #1, the converted data of the page L in parity storage area #2, and the converted data of the page L in parity storage area #3 in an L parity with a third size to generate write data corresponding to one page for the page L (Step S143).

The processor 12 controls a memory interface 15 such that an operation of writing the generated data corresponding to three pages U, M, and L is performed (Step S144). Then, the process ends.

Fifth Embodiment

Figure 23:
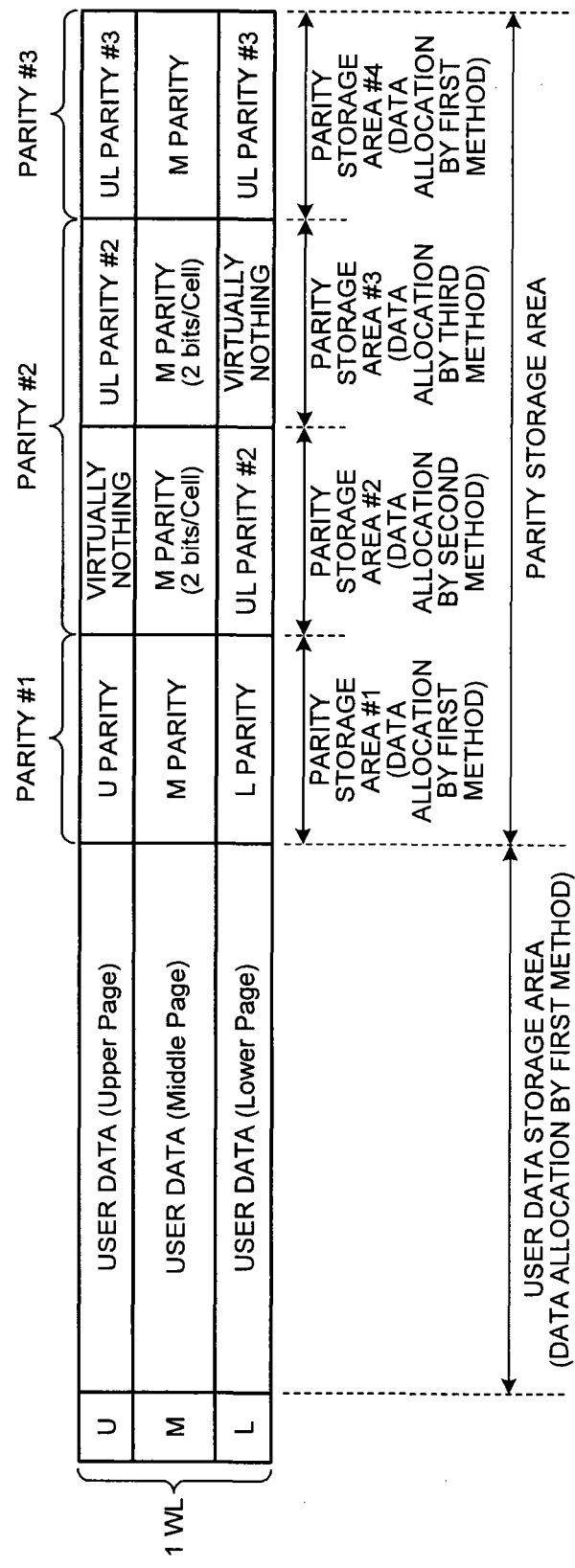
FIG. 23 is a diagram illustrating an example of the storage of data for one word line in a non-volatile memory according to a fifth embodiment.

FIG. 23 is a diagram illustrating an example of the storage of data for one word line in a non-volatile memory according to a fifth embodiment. A semiconductor memory system according to this embodiment has the same structure as that according to the first embodiment. In the third embodiment, the multi-stage error correction method is applied to the embodiment. However, in this embodiment, a multi-grain multi-stage error correction method is applied. In this way, the parities of all pages to which the multi-stage error correction method is applied can also be used as the ECC correction parity in the second stage and it is possible to effectively perform error correction with a small amount of parity.

As disclosed in U.S. Patent Application No. 61/646,490, in the multi-grain multi-stage error correction method, a generation polynomial used to generate parities in each stage is the same as that in the multi-stage error correction method and the number (size) of data items used to generate the parities is different in each stage. U.S. Patent Application No. 61/646,490 is incorporated by reference herein. For example, when there are two user data items, that is, user data #1 and user data #2, in the multi-stage error correction method applied in the third embodiment, parities are generated in multiple stages for user data #1 and parities are generated in multiple stages for user data #2. In contrast, the multi-grain multi-stage error correction method generates parities in the first stage using, for example, user data #1 and a generation polynomial $G_1(x)$ and generates parities in the second stage using user data #1+the parities in the first stage, user data #2+the parities in the first stage, and a generation polynomial $G_2(x)$. In this way, it is possible to change the size of user data to be protected with the parities in the first stage and the parities in the second stage.

In this embodiment, the multi-grain multi-stage error correction method is applied to a page U and a page L. However, the page to which the multi-grain multi-stage error correction method is applied may be arbitrarily selected. For example, the multi-grain multi-stage error correction method may be applied to the page L in the first embodiment.

As illustrated in FIG. 23, in this embodiment, a parity storage area is divided into parity storage area #1 to parity storage area #4 and UL parity #2, which is a parity in the second stage generated with the user data of the page U and the user data of the page L, is divided into two parts and is separately stored in parity storage area #2 and parity storage area #3. UL parity #3, which is a parity of UL parity #2, is divided into two parts and is separately stored in parity storage area #4. Then, similarly to the third embodiment, data allocation (data coding) by the first method is performed for the user data, parity storage area #1, and parity storage area #4, data allocation by the second method is performed for parity storage area #2, and data allocation by the third method is performed for parity storage area #3.

In this embodiment, an example in which the multi-grain multi-stage error correction method is applied to the second embodiment is described. However, similarly to the modification of the fourth embodiment for the third embodiment, since parity #2 (UL parity #2) is generally a small amount of data and has a small size, the probability of an error occurring in parity #2 is very low. Therefore, it is possible to omit parity #3 (UL parity #3) and a process using parity #3 (UL parity #3) from this embodiment.

In this embodiment, the division of the parity storage area is the same as that in the third embodiment, but this embodiment differs from the third embodiment in the property of the parity to be stored. The error correction parity in the second stage is also used as the parity of all pages to which the multi-grain multi-stage error correction method is applied. In this embodiment, this is represented by UL parity #2 and is divided and separately stored in the page U and the page L. In the multi-grain multi-stage error correction method, during ECC correction in the second stage, a parity (UL parity #3) for correcting UL parity #2 is stored in parity storage area #4 such that the process can be performed on the assumption that no error is included in the parity data to be added. UL parity #3 is also divided and separately stored in the page U and the page L. In addition, similarly to the third embodiment, a portion of the M parity is stored in the page M in parity storage area #4.

Figure 24A:
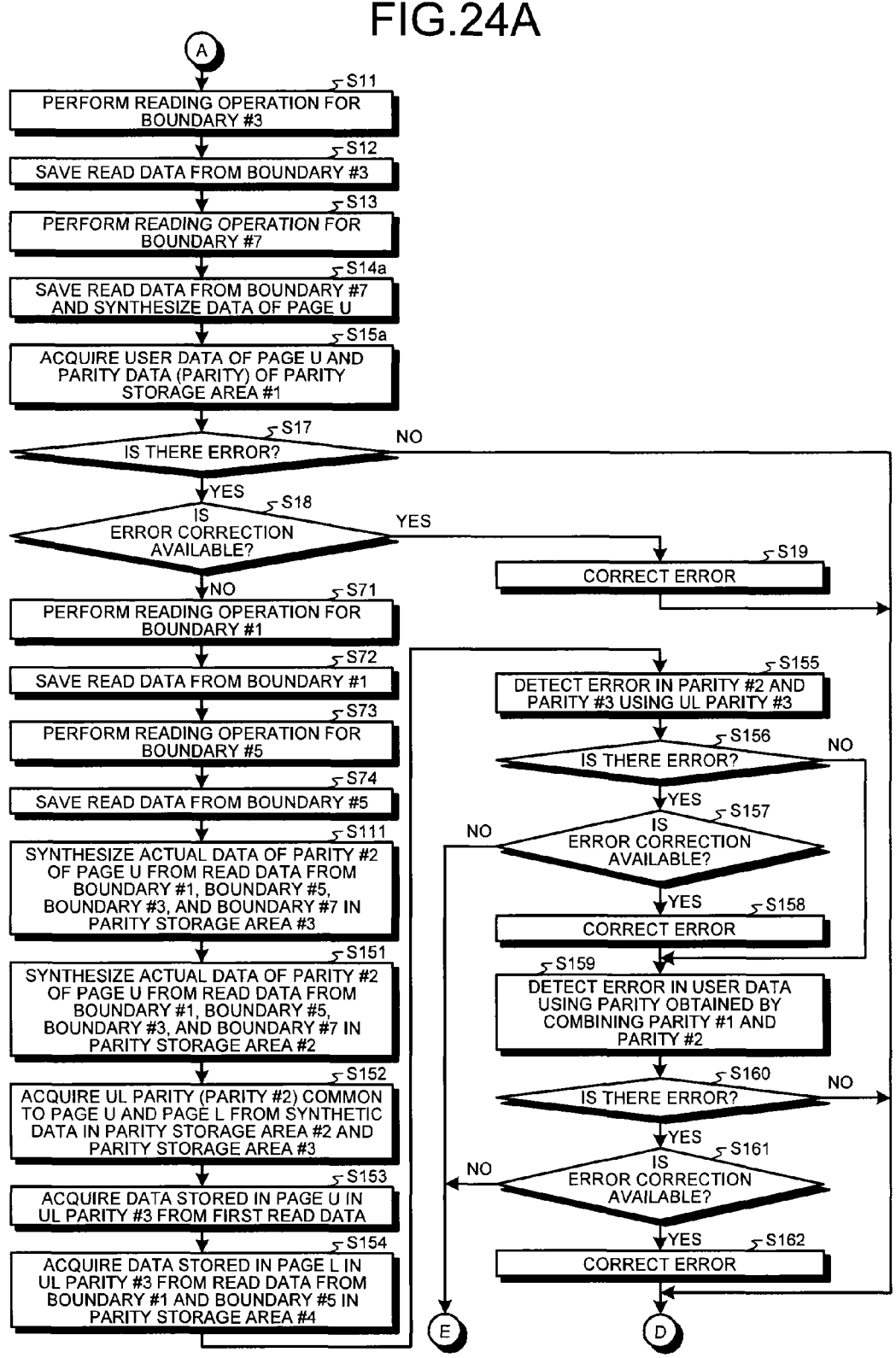
FIGS. 24A and 24B are flowcharts illustrating an example of an error correction process when data is read from a NAND flash memory according to the fifth embodiment.
Figure 24B:
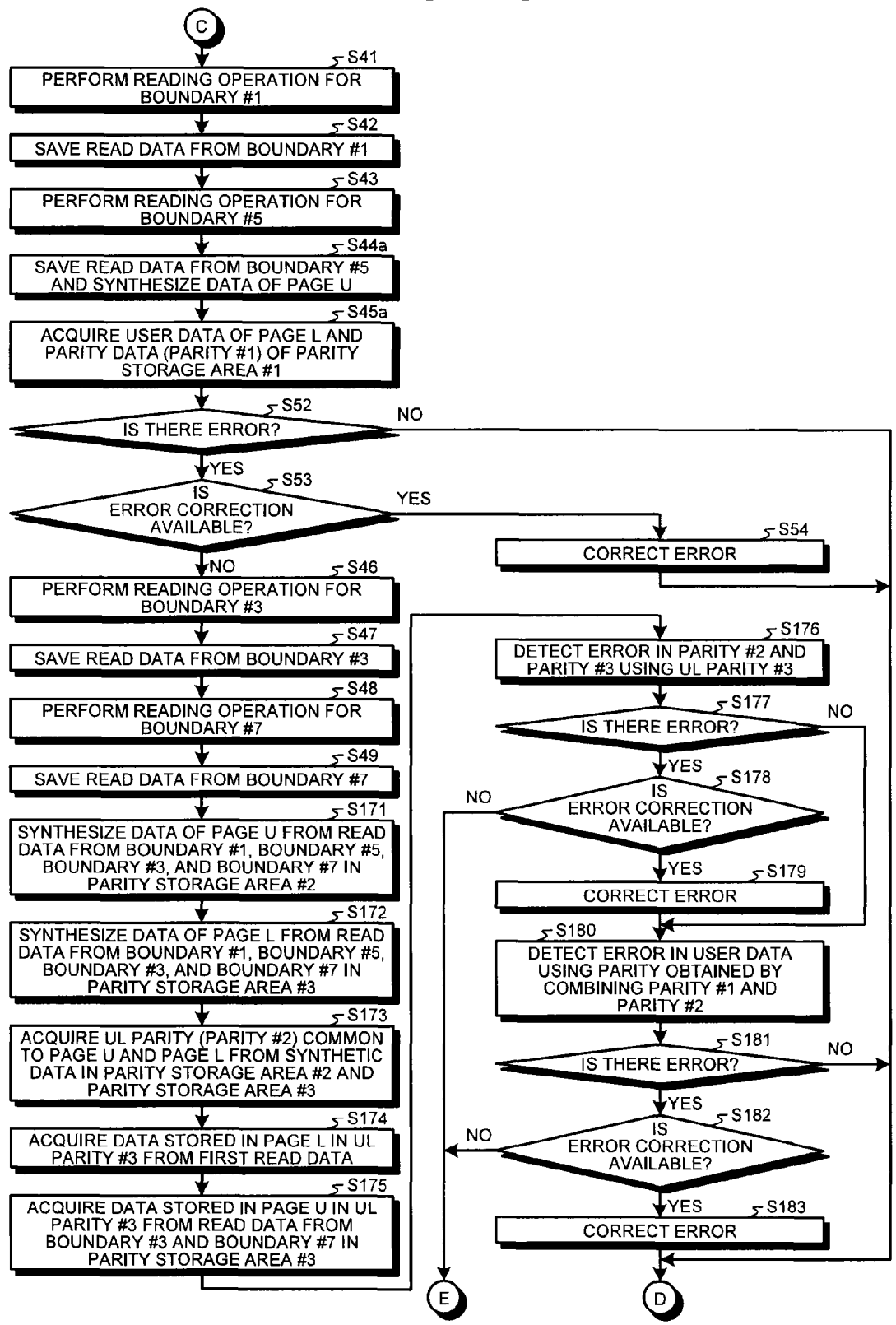

FIGS. 24A and 24B are flowcharts illustrating an example of an error correction process when data is read from the NAND flash memory 2 according to this embodiment. In this embodiment, similarly to the first embodiment, since the flow varies depending on whether the page to be read is an upper page, a middle page, or a lower page, first, it is determined whether the page to be read is the upper page, the middle page, or the lower page (Step S1), which is not illustrated since the step is the same as that in FIG. 9A in the first embodiment. In addition, since the end process is the same as that in FIG. 9B in the first embodiment, it is not illustrated.

When it is determined in Step S1 that the page to be read is the page U (Step S1: U), the same Steps S11 to S13, 14a, S15a, S17 to S19, S71 to S74, and S111 as those in the third embodiment are performed, as illustrated in FIG. 24A. After Step S111, the processor 12 synthesizes the actual data (data stored in the page L in UL parity #2) of the page L using the read data from boundary #1, boundary #5, boundary #3, and boundary #7 in parity storage area #3 (Step S151).

Then, the processor 12 acquires UL parity #2 from synthetic data in parity storage area #2 and parity storage area #3 (Step S152). Then, the processor 12 acquires data stored in the page U in UL parity #3 from the data saved in Steps S12 and S14a (Step S153). Then, the processor 12 acquires data stored in the page L in UL parity #3 from the read data from boundary #1 and boundary #5 in parity storage area #4 (Step S154). Then, the processor 12 detects an error in UL parity #2 using UL parity #3 and UL parity #2 (Step S155) and determines whether there is an error (Step S156). When there is an error (Yes in Step S156), it is determined whether error correction is available (Step S157). When error correction is available (Yes in Step S157), data inversion is performed for all bits which are detected as an error to correct the error (Step S158). Then, the processor 12 detects an error in the user data of the page U using UL parity #1 and U parity #1 (Step S159).

Then, it is determined whether there is an error (Step S160). When there is an error (Yes in Step S160), it is determined whether error correction is available (Step S161). When error correction is available (Yes in Step S161), data inversion is performed for all bits which are detected as an error to correct the error (Step S162). Then, the process ends.

When it is determined in Step S156 that there is no error (No in Step S156), the process proceeds to Step S159. When it is determined in Step S157 that error correction is not available (error bits are greater than the number of bits of ECC correction capability) (No in Step S157), the processor 12 notifies the outside that error correction is not available (Step S2 in FIG. 9B). Then, the process ends.

When it is determined in Step S160 that there is no error (No in Step S160), the process ends. When it is determined in Step S161 that error correction is not available (No in Step S162), the processor 12 notifies the outside that error correction is not available (Step S2 in FIG. 9B). Then, the process ends.

When it is determined in Step S1 that the page to be read is the page M (Step S1: M), the same process as that illustrated in FIG. 15b in the second embodiment is performed.

When it is determined in Step S1 that the page to be read is the page L (Step S1: L), the process illustrated in FIG. 24B is performed. The process to Steps S41 to S43, S44a, S45a, S52 to 54, and S46 to S49 is the same as that illustrated in FIG. 19C in the third embodiment. After Step S49, the processor 12 synthesizes the actual data (data stored in the page U in UL parity #2) of the page U using the read data from boundary #1, boundary #5, boundary #3, and boundary #7 in parity storage area #2 (Step S171).

Then, the processor 12 synthesizes the actual data (data stored in the page L in UL parity #2) of the page L using the read data from boundary #1, boundary #5, boundary #3, and boundary #7 in parity storage area #3 (Step S172). The processor 12 acquires UL parity #2 from synthetic data in parity storage area #2 and parity storage area #3 (Step S173). Then, the processor 12 acquires data stored in the page L in UL parity #3 from the data saved in Steps S42 and S44a (Step S174). Then, the processor 12 acquires data stored in the page U in UL parity #3 from the read data from boundary #3 and boundary #7 in parity storage area #4 (Step S175). Then, the processor 12 detects an error in UL parity #2 using UL parity #3 and UL parity #2 (Step S176) and determines whether there is an error (Step S177). When there is an error (Yes in Step S177), it is determined whether error correction is available (Step S178). When error correction is available (Yes in Step S178), data inversion is performed on all bits which are detected as an error to correct the error (Step S179). Then, the processor 12 detects an error in the user data of the page L using UL parity #1 and L parity #1 (Step S180).

Then, it is determined whether there is an error (Step S181). When there is an error (Yes in Step S181), it is determined whether error correction is available (Step S182). When error correction is available (Yes in Step S182), data inversion is performed on all bits which are detected as an error to correct the error (Step S183). Then, the process ends.

When it is determined in Step S177 that there is no error (No in Step S177), the process proceeds to Step S180. When it is determined in Step S178 that error correction is not available (No in Step S178), the processor 12 notifies the outside that error correction is not available (Step S2 in FIG. 9B). Then, the process ends.

When it is determined in Step S181 that there is no error (No in Step S181), the process ends. When it is determined in Step S182 that error correction is not available (No in Step S182), the processor 12 notifies the outside that error correction is not available (Step S2 in FIG. 9B). Then, the process ends.

In FIG. 25, Steps S61a, S62, and S63a are the same as those in the third embodiment. After Step S63a, the processor 12 generates UL parity #2, which is a common parity, using the user data and U parity #1 of the page U and the user data and L parity #1 of the page L (Step S191). Then, the processor 12 divides UL parity #2 into data to be stored in parity storage area #3 of the page U and data to be stored in parity storage area #2 of the page L (Step S192).

The processor 12 converts data that is two times more than the size of parity storage area #2 in the M parity and data stored in parity storage area #2 in UL parity #2 using the conversion table for data allocation by the second method and generates data for parity storage area #2 of the pages U, M, and L (Step S193).

The processor 12 converts data that is two times more than the size of parity storage area #3 in the M parity and data stored in parity storage area #3 in UL parity #2 using the conversion table for data allocation by the third method and generates data for parity storage area #3 of the pages U, M, and L (Step S194).

The processor 12 generates a parity (UL parity #3) with a fourth size for UL parity #2 (UL parity #2 stored in parity storage area #3 of the page U and UL parity #2 stored in parity storage area #2 of the page L) (Step S195). The processor 12 divides UL parity #3 into data to be stored in parity storage area #4 of the page U and data to be stored in parity storage area #4 of the page L (Step S196).

The processor 12 combines the user data of the page U, U parity #1, the converted data in parity storage area #2, the converted data in parity storage area #3, and the data stored in parity storage area #4 to generate write data corresponding to one page U (Step S197).

The processor 12 combines the user data of the page M, and data stored in parity storage area #1, the converted data in parity storage area #2, the converted data in parity storage area #3, and the data stored in parity storage area #4 in the M parity to generate write data corresponding to one page M (Step S198).

The processor 12 combines the user data of the page L, L parity #1, the converted data in parity storage area #2, the converted data in parity storage area #3, and the data stored in parity storage area #4 to generate write data corresponding to one page L (Step S199).

The processor 12 controls the memory interface 15 such that an operation of writing the generated data corresponding to three pages U, M, and L is performed (Step S200). Then, the process ends.

In this embodiment, the application of the multi-grain multi-stage error correction method makes it possible to use the ECC correction parity in the second stage for all pages to which the multi-stage error correction method is applied. Therefore, it is possible to effectively perform error correction with a small amount of parity.

In each of the above-described embodiments, an example in which data is allocated to each page has been described in detail. However, in practice, the methods for allocating each bit to the page may be arbitrarily combined with each other. In addition, each bit may be stored at any address of each page.

In the above-described embodiments, the number of bits is 3 bits/cell. However, the invention can be applied to other number of bits (bits/cell).

In the above-described embodiments, the NAND flash memory is used as the non-volatile memory. However, the invention can be applied to other non-volatile memories storing a plurality of bits in one memory element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile semiconductor memory that includes memory cells each storing 3 bits, and each bit data of the 3 bits data is allocated to each threshold value distribution;
a control unit that performs control such that the threshold value distribution is allocated by first data coding in which a first page, a second page, and a third page are each 1 bit and data is written to the non-volatile semiconductor memory, a first bit of the 3 bits data indicating data of the first page, a second bit thereof indicating data of the second page, and a third bit thereof indicating data of the third page; and
an encoding unit that generates a first parity with a first size for user data stored in the first page, generates a second parity with a second size for user data stored in the second page, and generates a third parity with a third size for user data stored in the third page,
wherein the control unit performs control such that the user data, the first parity, the third parity, and a portion of the second parity are written to the non-volatile semiconductor memory by the first data coding and performs control such that a portion of the second parity and a portion of the third parity are allocated to each threshold value by second data coding in which the first page is 0 bit, the second page is 2 bits, and the third page is 1 bit and are written to the non-volatile semiconductor memory.

2. The memory system according to claim 1,
wherein in the second page, there are three boundaries in the first data coding.

3. The memory system according to claim 1,
wherein the control unit performs control such that a portion of the first parity is written to the non-volatile semiconductor memory by the first data coding and performs control such that a portion of the third parity and a portion of the first parity are written to the non-volatile semiconductor memory by third data coding in which the third page is 0 bit, the second page is 2 bits, and the first page is 1 bit.

4. The memory system according to claim 1, further comprising:
an error correction processing unit that corrects an error in the user data of the first page using the first parity read from the non-volatile semiconductor memory, corrects an error in the user data of the second page using the second parity written by the first data coding and the second parity written by the second data coding which are read from the non-volatile semiconductor memory, and corrects an error in the user data of the third page using the third parity written by the first data coding and the third parity written by the second data coding which are read from the non-volatile semiconductor memory.

5. The memory system according to claim 1,
wherein the encoding unit generates at least one of the first parity and the third parity using a multi-stage error correction method in which a generation polynomial used to generate a parity in an i-th stage (i is an integer equal to or greater than 1 and equal to or less than n) is selected on the basis of a generation polynomial used to generate parities in first to (i−1)-th stages.

6. The memory system according to claim 5, further comprising:
an error correction processing unit that corrects an error in the user data of the second page using the second parity written by the first data coding, the second parity written by the second data coding, and the second parity written by the third data coding, corrects an error in the user data of the first page using the parity in the first stage in the first parity, corrects an error in the user data of the first page using the parities in the first and second stages in the first parity and an error in the user data of the third page using the parity in the first stage in the third parity when the correction of the error by the error correction is not available, and corrects an error in the user data of the third page using the parities in the first and second stages in the third parity when the correction of the error by the error correction is not available.

7. The memory system according to claim 5,
wherein the encoding unit sets the number of stages in the multi-stage error correction method to 2, further generates the parity in the second stage in the first parity as a first external parity, and further generates the parity in the second stage in the third parity as a second external parity, and
the control unit performs control such that the parity in the first stage in the first parity and the parity in the first stage in the third parity are written to the non-volatile semiconductor memory by the first data coding, performs control such that the parity in the second stage in the first parity and a portion of the second parity are written to the non-volatile semiconductor memory by the second data coding, performs control such that the parity in the second stage in the third parity and a portion of the second parity are written to the non-volatile semiconductor memory by third data coding in which the third page is 0 bit, the second page is 2 bits, and the first page is 1 bit, and performs control such that the first external parity and the second external parity are written to the non-volatile semiconductor memory by the data coding.

8. The memory system according to claim 5,
wherein the number of stages in the multi-stage error correction method is 2,
the control unit performs control such that the parity in the first stage in the first parity and the parity in the first stage in the third parity are written to the non-volatile semiconductor memory by the first data coding, performs control such that the parity in the second stage in the first parity and a portion of the second parity are written to the non-volatile semiconductor memory by the second data coding, and performs control such that the parity in the second stage in the third parity and a portion of the second parity are written to the non-volatile semiconductor memory by third data coding in which the third page is 0 bit, the second page is 2 bits, and the first page is 1 bit.

9. The memory system according to claim 1,
wherein the encoding unit generates the first parity and the third parity using a multi-grain multi-stage error correction method in which a generation polynomial used to generate a parity in an i-th stage (i is an integer equal to or greater than 1 and equal to or less than n) is selected on the basis of a generation polynomial used to generate parities in first to (i−1)-th stages and a user data size varies depending on the stage.

10. The memory system according to claim 9,
wherein the encoding unit generates the parity in the first stage in the first parity using the user data of the first page, generates the parity in the first stage in the third parity using the user data of the third page, and generates the parity in the second stage, which is common to the first page and the third page, using the parity in the first stage in the first parity, the user data of the first page, the parity in the first stage in the third parity, and the user data of the third page, and
the control unit performs control such that the parity in the first stage in the first parity and the parity in the first stage in the third parity are written to the non-volatile semiconductor memory by the first data coding, performs control such that a portion of the common parity and a portion of the second parity are written to the non-volatile semiconductor memory by the second data coding, and performs control such that a portion of the common parity and a portion of the second parity are written to the non-volatile semiconductor memory by third data coding in which the third page is 0 bit, the second page is 2 bits, and the first page is 1 bit.

11. The memory system according to claim 9,
wherein the encoding unit generates the parity in the first stage in the first parity using the user data of the first page, generates the parity in the first stage in the third parity using the user data of the third page, generates the parity in the second stage, which is common to the first page and the third page, using the parity in the first stage in the first parity, the user data of the first page, the parity in the first stage in the third parity, and the user data of the third page, and generates the common parity as an external parity, and
the control unit performs control such that the parity in the first stage in the first parity, the parity in the first stage in the third parity, and the external parity are written to the non-volatile semiconductor memory by the first data coding, performs control such that a portion of the common parity and a portion of the second parity are written to the non-volatile semiconductor memory by the second data coding, and performs control such that a portion of the common parity and a portion of the second parity are written to the non-volatile semiconductor memory by third data coding in which the third page is 0 bit, the second page is 2 bits, and the first page is 1 bit.

12. A memory controller that controls a non-volatile semiconductor memory which includes memory cells each storing 3 bits, and each bit data of the 3 bits data is allocated to each threshold value distribution, comprising:
a control unit that performs control such that the threshold value distribution is allocated by first data coding in which a first page, a second page, and a third page are each 1 bit and data is written to the non-volatile semiconductor memory, a first bit of the 3 bits data indicating data of the first page, a second bit thereof indicating data of the second page, and a third bit thereof indicating data of the third page; and an encoding unit that generates a first parity with a first size for user data stored in the first page, generates a second parity with a second size for user data stored in the second page, and generates a third parity with a third size for user data stored in the third page, wherein the control unit performs control such that the user data, the first parity, the third parity, and a portion of the second parity are written to the non-volatile semiconductor memory by the first data coding and performs control such that a portion of the second parity and a portion of the third parity are allocated to each threshold value by second data coding in which the first page is 0 bit, the second page is 2 bits, and the third page is 1 bit and are written to the non-volatile semiconductor memory.

13. A memory control method that controls a non-volatile semiconductor memory which includes memory cells each storing 3 bits, and each bit data of the 3 bits data is allocated to each threshold value distribution, comprising:

performing control such that the threshold value distribution is allocated by first data coding in which a first page, a second page, and a third page are each 1 bit and data is written to the non-volatile semiconductor memory, a first bit of the 3 bits data indicating data of the first page, a second bit thereof indicating data of the second page, and a third bit thereof indicating data of the third page;

generating a first parity with a first size for user data stored in the first page, generating a second parity with a second size for user data stored in the second page, and generating a third parity with a third size for user data stored in the third page; and performing control such that the user data, the first parity, the third parity, and a portion of the second parity are written to the non-volatile semiconductor memory by the first data coding and performing control such that a portion of the second parity and a portion of the third parity are allocated to each threshold value by second data coding in which the first page is 0 bit, the second page is 2 bits, and the third page is 1 bit and are written to the non-volatile semiconductor memory.

* * * * *